(12) United States Patent
Venkataramanan et al.

(10) Patent No.: US 10,243,447 B2
(45) Date of Patent: Mar. 26, 2019

(54) CONVERTER CONTROL WITH REDUCED LINK CAPACITOR

(71) Applicant: Wisconsin Alumni Research Foundation, Madison, WI (US)

(72) Inventors: Venkata Giri Venkataramanan, Madison, WI (US); Mahima Gupta, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 0 days.

(21) Appl. No.: 15/422,766

(22) Filed: Feb. 2, 2017

(65) Prior Publication Data
US 2018/0219468 A1    Aug. 2, 2018

(51) Int. Cl.
*H02M 1/14* (2006.01)
*H02M 7/5387* (2007.01)
*H02M 1/00* (2006.01)

(52) U.S. Cl.
CPC ......... *H02M 1/14* (2013.01); *H02M 7/53875* (2013.01); *H02M 2001/0003* (2013.01)

(58) Field of Classification Search
CPC ......... H02M 3/33507; H02M 3/33523; H02M 3/3155; H02M 3/3376; H02M 1/12; H02M 1/126; H02M 1/14; H02M 1/143; H02M 1/146; H02M 1/15; H02M 2001/123; H02M 7/043; H02M 7/155; H02M 7/48; H02M 7/525; H02M 7/523; H02M 7/5236; H02M 7/53806; H02M 7/53875; H02M 7/5387; H02M 7/53871; H02M 7/537; H02M 7/003; Y02B 70/1441; Y02B 70/1433

USPC ..................................... 363/95–98, 131–132
See application file for complete search history.

(56) References Cited

U.S. PATENT DOCUMENTS

| | | |
|---|---|---|
| 4,677,539 A | 6/1987 | Erickson et al. |
| 6,879,062 B2 | 4/2005 | Oates |
| 7,102,903 B2 | 9/2006 | Nakamura et al. |
| 7,164,254 B2 | 1/2007 | Kerkman et al. |

(Continued)

OTHER PUBLICATIONS

Gupta, et al., A DC to Three-Phase Boost-Buck Inverter with Stored Energy Modulation and a Tiny DC Link Capacitor, 2016 IEEE Applied Power Electronics Conference and Exposition (APEC), Mar. 2016.

(Continued)

*Primary Examiner* — Kyle J Moody
*Assistant Examiner* — Kevin H Sprenger
(74) *Attorney, Agent, or Firm* — Bell & Manning, LLC

(57) ABSTRACT

A controller controls power between a source and a load with a link capacitor. (a) A switch vector is selected based on load and source values, a capacitor voltage value, and a switch state selection mode. The switch vector identifies an on or off configuration for load and source switches during a subcycle that allow or do not allow current flow between the link capacitor and the load switch or source switch. (b) The state of the load and source switches is controlled in the on configuration or in the off configuration based on the selected switch vector. (c) It is determined that it is time to select a next switch vector. (a) to (c) are repeated for each subcycle of the determined number of switching subcycles. At least one load switch and at least one source switch are simultaneously in the on configuration during at least one subcycle.

20 Claims, 18 Drawing Sheets

(56) References Cited

U.S. PATENT DOCUMENTS

| | | |
|---|---|---|
| 7,593,243 B2 | 9/2009 | Ganev et al. |
| 7,738,267 B1 | 6/2010 | Tallam et al. |
| 8,649,195 B2 | 2/2014 | Mao et al. |
| 8,842,454 B2 * | 9/2014 | Johnson .................. H02J 3/385 363/71 |
| 8,898,025 B2 * | 11/2014 | Yin ........................ H02J 3/01 702/58 |
| 8,934,276 B2 * | 1/2015 | Teo ....................... H02M 7/487 363/131 |
| 2004/0047166 A1 * | 3/2004 | Lopez-Santillana ........................ H02M 1/4225 363/89 |
| 2010/0090533 A1 | 4/2010 | Shimada et al. |
| 2010/0259955 A1 | 10/2010 | Shimada |
| 2015/0188453 A1 | 7/2015 | Damson et al. |
| 2017/0063248 A1 * | 3/2017 | Lee ........................ F24F 1/20 |
| 2017/0133922 A1 | 5/2017 | Venkataramanan et al. |

OTHER PUBLICATIONS

Gupta, et al., Four-Quadrant Permanent Magnet Synchronous Machine Drive with a Tiny DC Link Capacitor, 2016 IEEE Energy Conversion Congress and Exposition (ECCE), Sep. 2016.

Van Der Broeck et al., Analysis and Realization of a Pulsewidth Modulator Based on Voltage Space Vectors, IEEE Transactions on Industry Applications, vol. 24. No. 1, 1988, pp. 142-150.

Gupta et al., Quantum Modulated Voltage Source Converters with Minimal DC Bus Capacitance, WEMPEC 34th Annual Review Meeting, May 20, 2015.

Gupta et al., Three Phase Voltage Source Inverters with Only Decoupling Capacitors on the DC Bus, WEMPEC 34th Annual Review Meeting, May 20, 2015.

* cited by examiner

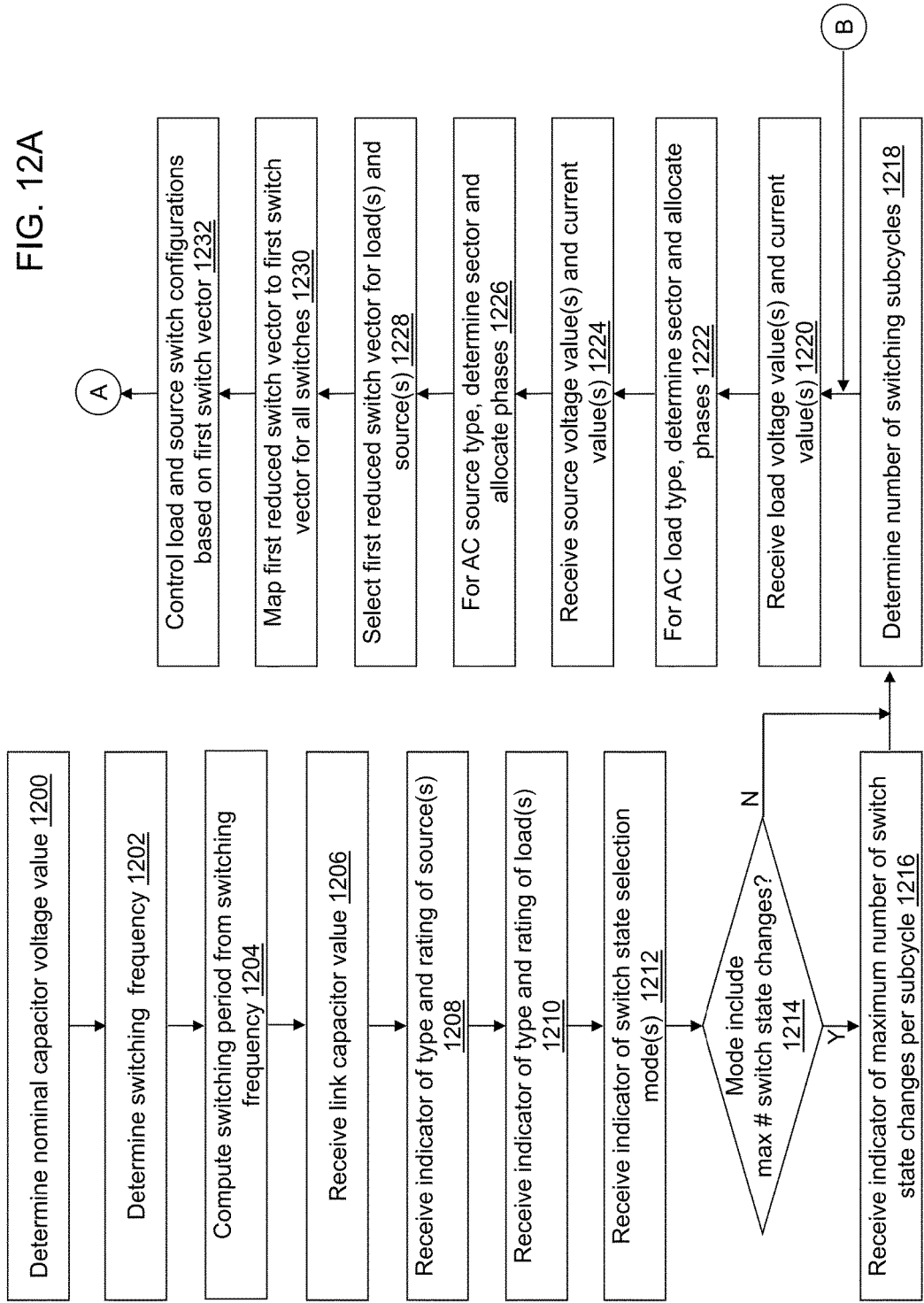

CONVERTER CONTROL WITH REDUCED LINK CAPACITOR

BACKGROUND

A converter is an electrical device for converting electrical energy from one form to another, such as between alternating current (AC) and direct current (DC), between different voltages or frequencies, or a combination of these. Three-phase electric power requires the use of power converters to control the flow of electric energy by supplying voltages and currents in a form that is optimally suited for the load. Conventional three-phase AC converter topologies use an intermediate capacitive DC link. To synthesize a sinusoidal output, sinusoidal pulse width modulation is typically used, and a stiff voltage is maintained across a DC link capacitor, which means essentially a constant voltage. The pulse width modulation approach defines a duty ratio of the interconnecting switches as a linear function of the ratio of the time varying AC output and the stiff voltage. In the case of inverters, rectifiers, and frequency converters, the DC link capacitor is sized to store enough energy to maintain several tens of cycles of the AC quantity at the rated power, which requires the use of large capacitors, commonly referred to as 'bulk' capacitors, and which tend to dominate the weight and volume of most converter technologies.

SUMMARY

In an example embodiment, a computer-readable medium is provided having stored thereon computer-readable instructions that when executed by a computing device, cause the computing device to control a transfer of energy between a source and a load with a reduced link capacitor. A time period value of a switching period is received. A number of switching subcycles is determined during the switching period. A load voltage value and a load current value for a load circuit is received. The load circuit is either a direct current (DC) load circuit or an alternating current (AC) load circuit having a number of load phases. A load switch is connected to the DC load circuit or to each load phase of the load phases of the AC load circuit. A source voltage value and a source current value for a source circuit is received. The source circuit is either a DC source circuit or an AC source circuit having a number of source phases. A source switch is connected to the DC source circuit or to each source phase of the source phases of the AC source circuit. A capacitor voltage value of a voltage across a capacitor connected in parallel across the source switch and the load switch is received.

(a) A switch vector is selected based on the received load voltage value, the received load current value, the received source voltage value, the received source current value, the received capacitor voltage value, and a predefined switch state selection mode. The switch vector identifies a state associated with each load switch and with each source switch during a subcycle. The state defines an on configuration or an off configuration. The on configuration allows a current to flow between the capacitor and the load switch or the source switch, and the off configuration does not allow the current to flow between the capacitor and the load switch or the source switch. (b) The state of each load switch and each source switch is controlled in the on configuration or in the off configuration based on the selected switch vector. (c) It is determined that it is time to select a next switch vector. (a) to (c) are repeated for each subcycle of the determined number of switching subcycles. At least one load switch and at least one source switch are simultaneously in the on configuration during at least one subcycle.

In another example embodiment, a controller is provided. The controller includes, but is not limited to, a processor and the computer-readable medium having stored thereon computer-readable instructions that when executed by a computing device, cause the computing device to control the transfer of energy between the source and the load with the reduced link capacitor.

In yet another example embodiment, a device is provided. The converter device includes, but is not limited to, a link capacitor, a source switch, a load switch, and the controller.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 12A and 12B depict a flow diagram illustrating examples of operations performed by a control application of the converter of the energy transfer system of FIG. 1 in accordance with an illustrative embodiment

DETAILED DESCRIPTION

Figure 1:
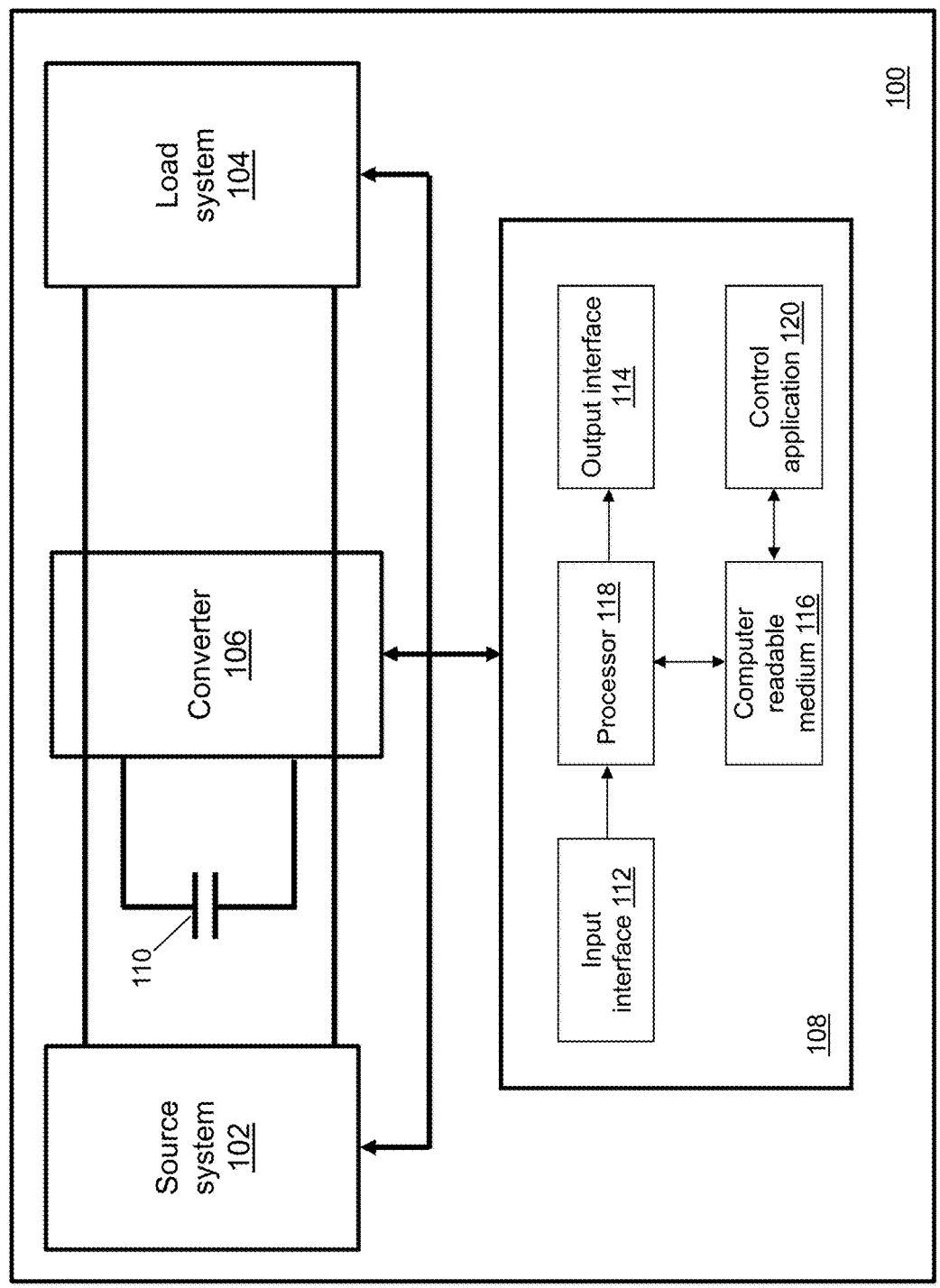
FIG. 1 is a block diagram of an energy transfer system in accordance with an illustrative embodiment.

Referring to FIG. 1, an energy transfer system 100 may include a source system 102, a load system 104, a converter 106, a controller 108, and a link capacitor 110. Source system 102 and load system 104 exchange energy through link capacitor 110 under control of controller 108 and converter 106. Link capacitor 110 is connected in parallel with converter 106. A capacitance of link capacitor 110 may be many orders of magnitude less than traditional designs for energy transfer system 100.

Source system 102 may include one or more alternating current (AC) and/or direct current (DC) source circuits that provide electrical power. Load system 104 may include one or more AC and/or DC load circuits that act as electrical loads that receive the provided electrical power. Some or all of source system 102 and/or load system 104 may provide bidirectional power flow such that a source circuit and/or a load circuit may act as a power source during a first time period and as an electrical load during a second time period.

During normal operating conditions, a total power supplied by all of the circuits acting as sources balance a total power consumed by all of the circuits acting as loads. In the event that there is a mismatch between total source and load power levels, a storage subsystem (not shown) may be added to energy transfer system 100 to ensure overall power balance across link capacitor 110. Link capacitor 110 is connected in parallel with respect to a switch associated with each DC load circuit or each phase of an AC load circuit, and each DC source circuit or each phase of an AC source circuit.

Controller 108 may be electrically connected to source system 102 and load system 104 to receive voltage, current, and/or power values used to define the parameters that control the energy transfer between source system 102 and load system 104 based on a current availability/demand across energy transfer system 100. The voltage, current, and/or power values may be received for each switching frequency interval, also referred to herein as a switching period, or may be received less frequently or more frequently depending on the dynamic needs of energy transfer system 100. Controller 108 may dynamically control converter 106 to act as an inverter, a rectifier, and/or a frequency converter.

Controller 108 is electrically connected to converter 106. Controller 108 controls the supply of power from source system 102 to load system 104 through command signals input to converter 106. The command signals are generated by controller 108 based on estimated or commanded voltage, current values, and/or power values based on known voltage, current, and/or power values of source system 102 and load system 104.

When energy transfer system 100 includes a DC load circuit or a DC source circuit, converter 106 includes a switch associated with each DC load circuit or with each DC source circuit. When energy transfer system 100 includes a plurality of AC load circuits and/or plurality of AC source circuits, converter 106 may include a plurality of converters with a converter connected to each AC source system, and each AC load system. Link capacitor 110 is connected in parallel between the source converter(s) and the load converter(s). Controller 108 controls the supply of power from the converter(s) of source system 102 to the converter(s) of load system 104 through command signals input to each converter.

Controller 108 may include an input interface 112, an output interface 114, a computer-readable medium 116, a processor 118, and a control application 120. Fewer, different, and additional components may be incorporated into controller 108. For example, controller 108 may include a communication interface (not shown). The communication interface provides an interface for receiving and transmitting data between devices using various protocols, transmission technologies, and media as understood by those skilled in the art. The communication interface may support communication using various transmission media that may be wired and/or wireless.

Input interface 112 provides an interface for receiving information from a user or from other devices for entry into controller 108 as understood by those skilled in the art. Input interface 112 may interface with various input technologies including, but not limited to, a keyboard, a mouse, a display, a track ball, a keypad, one or more buttons, etc. to allow the user to enter information into controller 108 or to make selections in a user interface displayed on the display. The same interface may support both input interface 112 and output interface 114. Controller 108 may have one or more input interfaces that use the same or a different input interface technology. Additional inputs to controller 108 may be the voltage, current, and/or power values received from source system 102 and/or load system 104.

Output interface 114 provides an interface for outputting information for review by a user of controller 108 and for input to another device. For example, output interface 114 may interface with various output technologies including, but not limited to, the display and a printer, etc. Controller 108 may have one or more output interfaces that use the same or a different interface technology. Additional outputs from controller 108 may be the command signals to converter 106.

Computer-readable medium 116 is an electronic holding place or storage for information so the information can be accessed by processor 118 as understood by those skilled in the art. Computer-readable medium 116 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Controller 108 may have one or more computer-readable media that use the same or a different memory media technology. For example, computer-readable medium 116 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Controller 108 also may have one or more drives that support the loading of a memory media such as a CD, DVD, an external hard drive, etc. One or more external hard drives further may be connected to controller 108 using the communication interface.

Processor 118 executes instructions as understood by those skilled in the art. The instructions may be carried out by a special purpose computer, logic circuits, or hardware circuits. Processor 118 may be implemented in hardware and/or firmware. Processor 118 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 118 operably couples with input interface 112, with output interface 114, and with computer-readable medium 116 to receive, to send, and to process information. Processor 118 may retrieve a set of instructions from a permanent memory device and copy the instructions in an executable form to a temporary memory device that is generally some form of RAM. Controller 108 may include a plurality of processors that use the same or a different processing technology.

Control application 120 performs operations associated with implementing some or all of the control of converter as described with reference to FIGS. 12A, 12B, and 16. The operations may be implemented using hardware, firmware, software, or any combination of these methods. Referring to the example embodiment of FIG. 1, control application 120 is implemented in software (comprised of computer-readable and/or computer-executable instructions) stored in computer-readable medium 116 and accessible by processor 118 for execution of the instructions that embody the operations of control application 120. Control application 120 may be written using one or more programming languages, assembly languages, scripting languages, etc.

Figure 2:
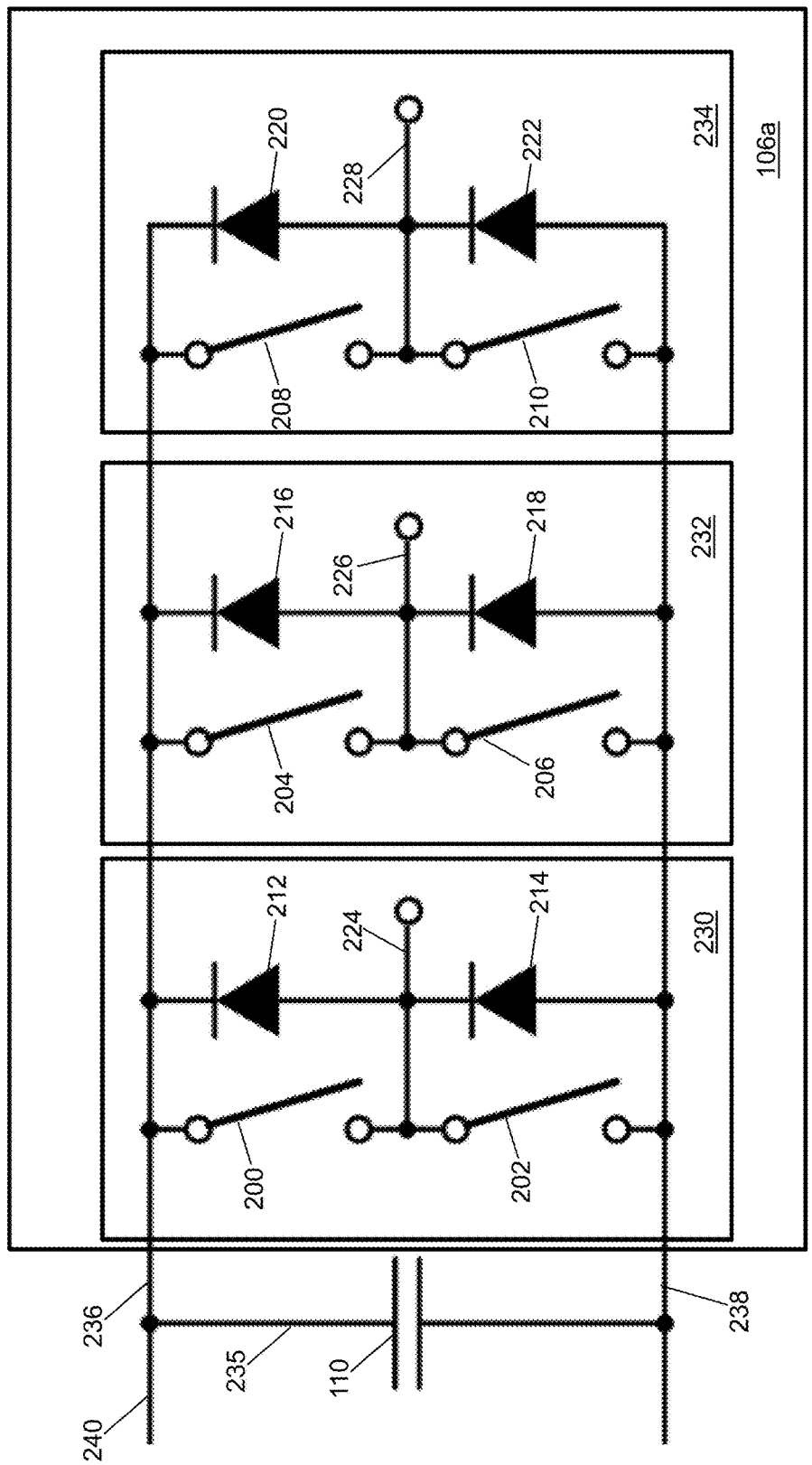
FIG. 2 is a schematic diagram of part of a converter of the energy transfer system of FIG. 1 in accordance with an illustrative embodiment.

Referring to FIG. 2, a circuit diagram of part of converter 106 implemented as a first converter 106a is shown in accordance with an illustrative embodiment. First converter 106a is a three-phase converter that may control the power provided to a load circuit or received from a source circuit. In the illustrative embodiment of FIG. 2, first converter 106a may include a first half-bridge 230, a second half-bridge 232, and a third half-bridge 234. In the illustrative embodiment, converter 106 may include a fewer or a greater number of phases including a DC current. For example, converter 106 may output two- or four-phase or DC waveforms. Converter 106 may include a half-bridge for each phase. Each half-bridge acts as a single pole, double throw (SPDT) switch selected as in an 'on' configuration or in an 'off' configuration based on a desired direction of current flow.

First half-bridge 230 may include a first switch-diode circuit and a second switch-diode circuit. The first switch-diode circuit may include a first top switch 200 and a first top diode 212 connected anti-parallel across first top switch 200.

Figure 3:
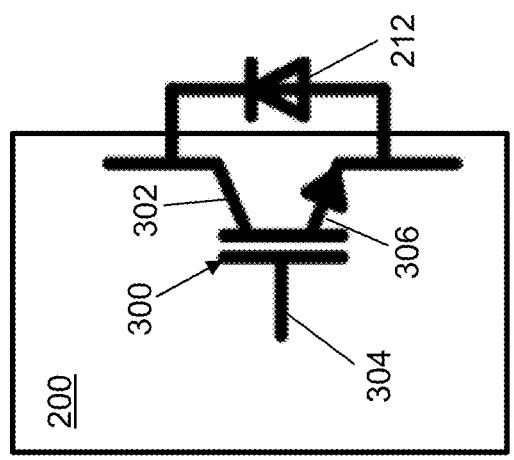
FIG. 3 is a switch-diode circuit of the converter of FIG. 2 in accordance with an illustrative embodiment.

Referring to FIG. 3, the first switch-diode circuit is shown in accordance with an illustrative embodiment. First top switch 200 may be implemented as a transistor switch 300. Transistor switch 300 may include a drain 302, a gate 304, and a source 306 like a metal-oxide-semiconductor field-effect transistor (MOSFET) or include a collector 302, a gate 304, and an emitter 306 like an insulated-gate bipolar transistor (IGBT), or include a collector 302, a base 304, and an emitter 306 like a bipolar junction transistor (BJT). Depending on the switching logic and whether transistor switch 300 is an n-type or a p-type, drain 302 and source 306 may be reversed. A voltage applied to gate 304 determines a switching state of transistor switch 300.

First top diode 212 is connected anti-parallel across source 306 and drain 302 of transistor switch 300. In an illustrative embodiment, transistor switch 300 is an insulated-gate field-effect transistor such as a MOSFET or an IGBT, which may be a silicon device, Gallium Nitride (GaN) device, Silicon Carbide (SiC) device, or other type of power semiconductor switch.

Referring again to FIG. 2, in the illustrative embodiment, the second switch-diode circuit may include a first bottom switch 202 and a first bottom diode 214 connected anti-parallel across first bottom switch 202 similar to the first switch-diode circuit. For illustration, first bottom switch 202 may also be implemented as transistor switch 300. Source 306 of transistor switch 300 of the first switch-diode circuit is connected to drain 302 of transistor switch 300 of the second switch-diode circuit. Drain 302 of transistor switch 300 of the first switch-diode circuit is connected to a top line 236. Top line 236 may be referred to as a positive bus. Source 306 of transistor switch 300 of the second switch-diode circuit is connected to a bottom line 238. Bottom line 238 may be referred to as a negative bus.

Gate 304 of transistor switch 300 of the first switch-diode circuit and gate 304 of transistor switch 300 of the second switch-diode circuit are connected to controller 108 to receive gating signals to control a state of first top switch 200 and first bottom switch 202, respectively. At any point in time, only one of first top switch 200 and first bottom switch 202 is effectively closed. A first-phase line 224 is connected between source 306 of transistor switch 300 of the first switch-diode circuit and drain 302 of transistor switch 300 of the second switch-diode circuit. A direction of current flow from first-phase line 224 to top line 236 through first top switch 200 indicates first half-bridge 230 is charging link capacitor 110, and a direction of current flow from top line 236 to first-phase line 224 through first top switch 200 indicates first half-bridge 230 is discharging link capacitor 110. When first top switch 200 is effectively closed, first half-bridge 230 is in the 'on' configuration or in a one '1' state. When first bottom switch 202 is effectively closed, first half-bridge 230 is in the 'off' configuration or in a zero '0' state.

Link capacitor 110 is connected in parallel with first converter 106a between top line 236 and bottom line 238. A half-bridge is included for each phase voltage/current output from converter 106. In the illustrative embodiment of first converter 106a, first converter 106a includes three half-bridges 230, 232, 234. Second half-bridge 232 is identical to first half-bridge 230 and includes a third switch-diode circuit and a fourth switch-diode circuit. The third switch-diode circuit includes a second top switch 204 and a second top diode 216 connected anti-parallel across second top switch 204. The fourth switch-diode circuit includes a second bottom switch 206 and a second bottom diode 218 connected anti-parallel across second bottom switch 206. Again, second top switch 204 and second bottom switch 206 may be implemented as transistor switch 300 and connected in an identical manner to that described for first top switch 200 and first bottom switch 202.

Gate 304 of transistor switch 300 of the third switch-diode circuit and gate 304 of transistor switch 300 of the fourth switch-diode circuit are connected to controller 108 to receive gating signals to control a state of second top switch 204 and second bottom switch 206, respectively. At any point in time, only one of second top switch 204 and second bottom switch 206 is effectively closed. A second-phase line 226 is connected between source 306 of transistor switch 300 of the third switch-diode circuit and drain 302 of transistor switch 300 of the fourth switch-diode circuit. A direction of current flow from second-phase line 226 to top line 236 through second top switch 204 indicates second half-bridge 232 is charging link capacitor 110, and a direction of current flow from top line 236 to second-phase line 226 through second top switch 204 indicates second half-bridge 232 is discharging link capacitor 110. When second top switch 204 is effectively closed, second half-bridge 232 is in the 'on' configuration or in the one '1' state. When second bottom switch 206 is effectively closed, second half-bridge 232 is in the 'off' configuration or in the zero '0' state.

Third half-bridge 234 is identical to first half-bridge 230 and includes a fifth switch-diode circuit and a sixth switch-diode circuit. The fifth switch-diode circuit includes a third top switch 208 and a third top diode 220 connected anti-parallel across third top switch 208. The sixth switch-diode circuit includes a third bottom switch 210 and a third bottom diode 222 connected anti-parallel across third bottom switch 210. Again, third top switch 208 and third bottom switch 210 may be implemented as transistor switch 300 and connected in an identical manner to that described for first top switch 200 and first bottom switch 202.

Gate 304 of transistor switch 300 of the fifth switch-diode circuit and gate 304 of transistor switch 300 of the sixth switch-diode circuit are connected to controller 108 to receive gating signals to control a state of third top switch 208 and third bottom switch 210, respectively. At any point in time, only one of third top switch 208 and third bottom switch 210 is effectively closed. A third-phase line 228 is connected between source 306 of transistor switch 300 of the fifth switch-diode circuit and drain 302 of transistor switch 300 of the sixth switch-diode circuit. A direction of current flow from third-phase line 228 to top line 236 through third top switch 208 indicates third half-bridge 234 is charging link capacitor 110, and a direction of current flow from top line 236 to third-phase line 228 through third top switch 208 indicates third half-bridge 234 is discharging link capacitor 110. When third top switch 208 is effectively closed, third half-bridge 234 is in the 'on' configuration or in the one '1' state. When third bottom switch 210 is effectively closed, third half-bridge 234 is in the 'off' configuration or in the zero '0' state.

First top switch 200, second top switch 204, and third top switch 208 operate with an inverse of a duty ratio of first bottom switch 202, second bottom switch 206, and third bottom switch 210, respectively. First top switch 200, second top switch 204, and third top switch 208 may be referred to as positive throws, and first bottom switch 202, second bottom switch 206, and third bottom switch 210 may be referred to as negative throws herein.

Figure 4A:
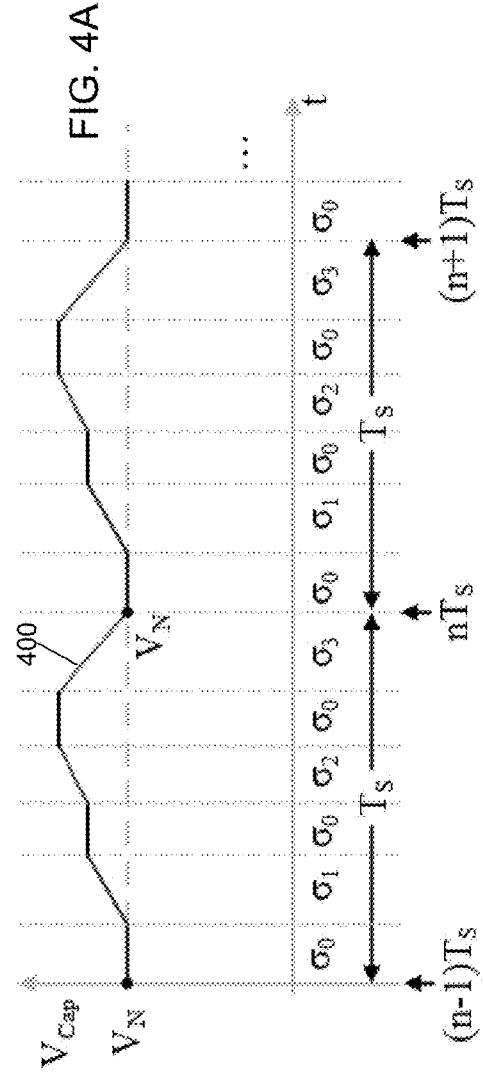
FIGS. 4A and 4B show a capacitor voltage across a link capacitor of the energy transfer system of FIG. 1 as a function of time for two switching periods in accordance with an illustrative embodiment.

Referring to FIG. 4A, a capacitor voltage across link capacitor 110 is shown in accordance with a first illustrative embodiment. Link capacitor 110 is charged to a predefined, nominal capacitor voltage value $V_N$ as shown by a first capacitor voltage curve 400 at a beginning and an end of each switching period $T_S$. Converter 106 controls charge and discharge cycles during a plurality of subcycles for each switching period $T_S$. $T_S$ is an inverse of a switching frequency $f_s=1/T_S$. In an illustrative embodiment, $f_s$ is much higher than a frequency $f_p$ of the source and/or load in energy transfer system 100. For illustration, $f_s$ is at least 1 kilohertz (kHz) resulting in a switching period of less than one millisecond while $f_p$ may be 60 Hz. $f_s$ can be at least 100 times $f_p$ and can be variable. First capacitor voltage curve 400 may change as a function of time to satisfy the demands between source system 102 and load system 104.

Figure 4B:
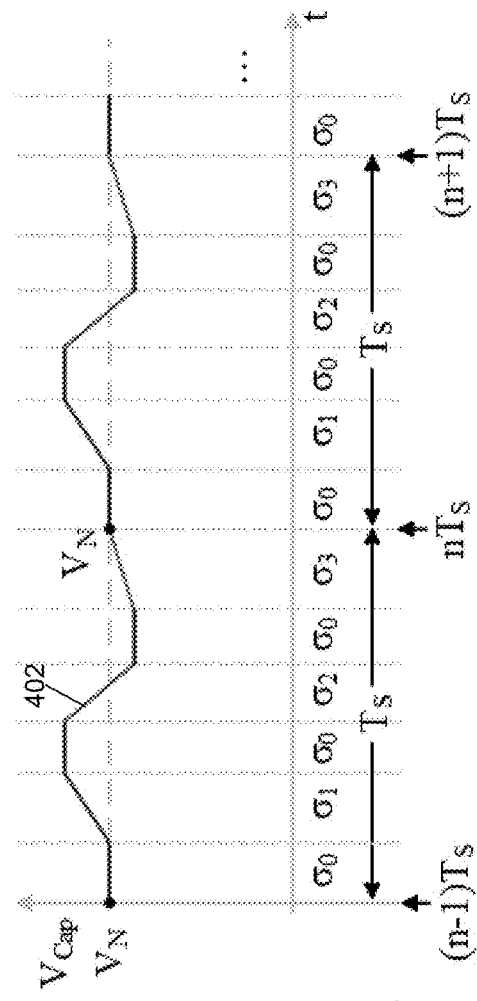

Referring to FIG. 4B, the capacitor voltage across link capacitor 110 is shown in accordance with a second illustrative embodiment. Link capacitor 110 is charged to $V_N$ at the beginning and the end of each switching period $T_S$ as shown by a second capacitor voltage curve 402. Though a different algorithm may be used to define second capacitor voltage curve 402 relative to first capacitor voltage curve 400, at the end of each switching period $T_S$, the capacitor voltage again starts and ends at $V_N$.

Every high frequency switching period can be divided into several subcycles represented as $\sigma_i$, where i=1, 2, . . . . Link capacitor 110 is charged or discharged during each subcycle of switching period $T_s$ as indicated in FIGS. 4A and 4B. Link capacitor 110 may have an idle subcycle denoted as $\sigma_0$ during which a capacitor voltage $V_{Cap}$ remains constant. At a start of operation, link capacitor 110 holds energy $CV_N^2/2$, where C is a capacitance value of link capacitor 110. Under normal operating conditions, when there is power balance between source system 102 and load system 104, link capacitor 110 is restored back to $V_N$ gaining or losing energy it lost or gained during a previous subcycle. During each subcycle, link capacitor 110 is connected to one or more sources and/or loads, by deliberate design, depending on the power transfer requirements between sources and loads that are specified in terms of their voltages and currents.

Figure 5:
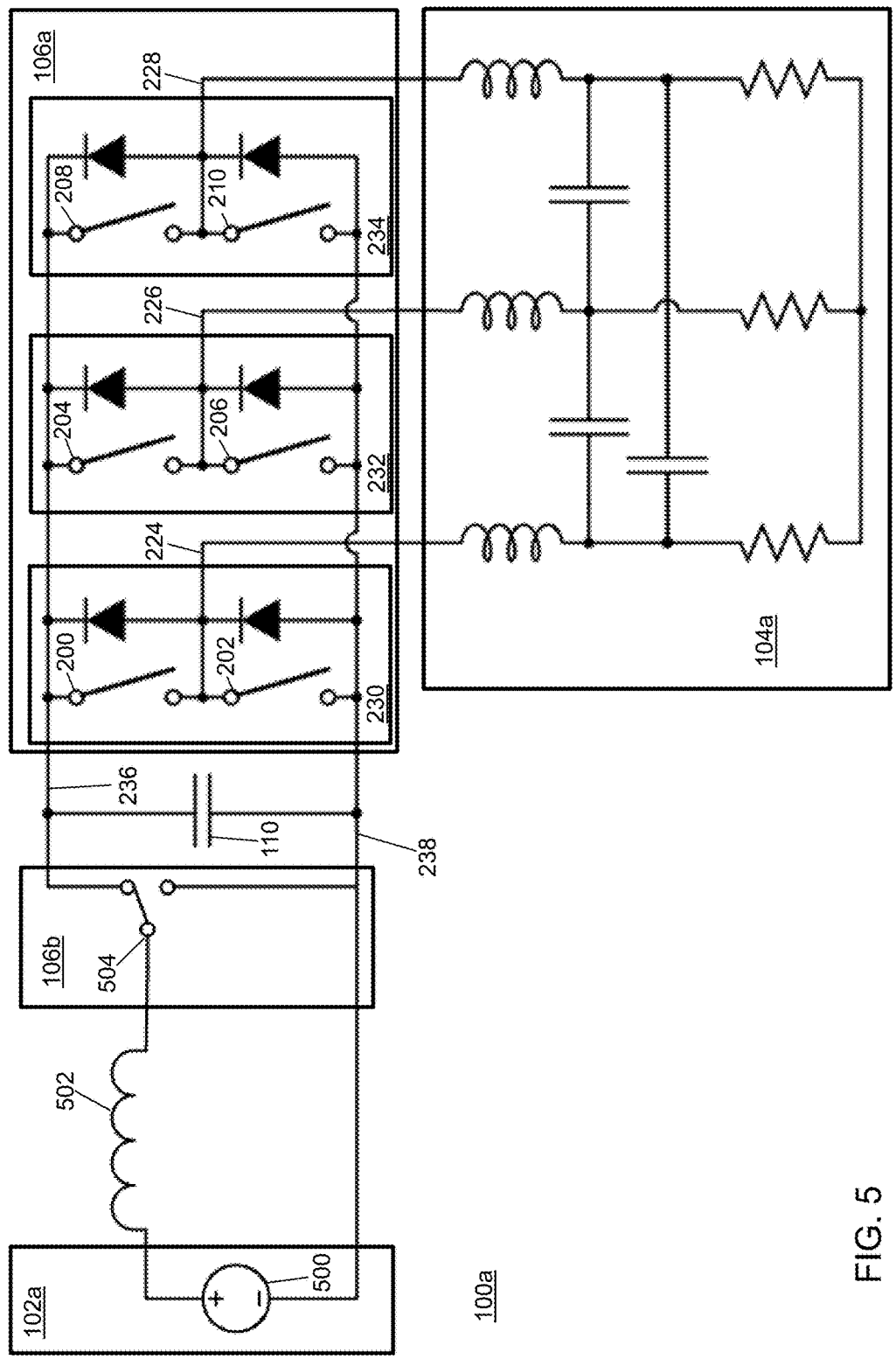
FIG. 5 is a schematic diagram of a first energy transfer system in accordance with an illustrative embodiment.

Referring to FIG. 5, a circuit diagram of a first energy transfer system 100a is shown in accordance with a first illustrative embodiment. First energy transfer system 100a may include a first source system 102a, a first load system 104a, first converter 106a, a second converter 106b, controller 108 (not shown in FIG. 5), and link capacitor 110. Converter 106 includes first converter 106a and second converter 106b each of which is controlled by controller 108. In the illustrative embodiment of FIG. 5, first source system 102a includes a single source circuit that includes a DC power source 500. Second converter 106b is a single-phase or DC converter. Inductor 502 and a source control switch 504 are connected in series with DC power source 500, which together can be visualized as a DC-DC boost chopper. Link capacitor 110 is connected in parallel with first converter 106a and second converter 106b, between top line 236 and bottom line 238. Source control switch 504 is connected in the 'on' configuration to charge link capacitor 110 in a first position as illustrated in FIG. 5 and to disconnect first source system 102a from link capacitor 110 when in a second position or in the 'off' configuration.

Source control switch 504 may be implemented as a single half-bridge identical to first half-bridge 230 such that source control switch 504 can be in the 'on' configuration or in the one '1' state or can be in the 'off' configuration or in the zero '0' state. Alternatively, each half-bridge such as source control switch 504, first half-bridge 230, second half-bridge 232, third half-bridge 234, etc. may be replaced with other types of single pole double throw (SPDT) switch configurations as understood by a person of skill in the art.

Figure 6:
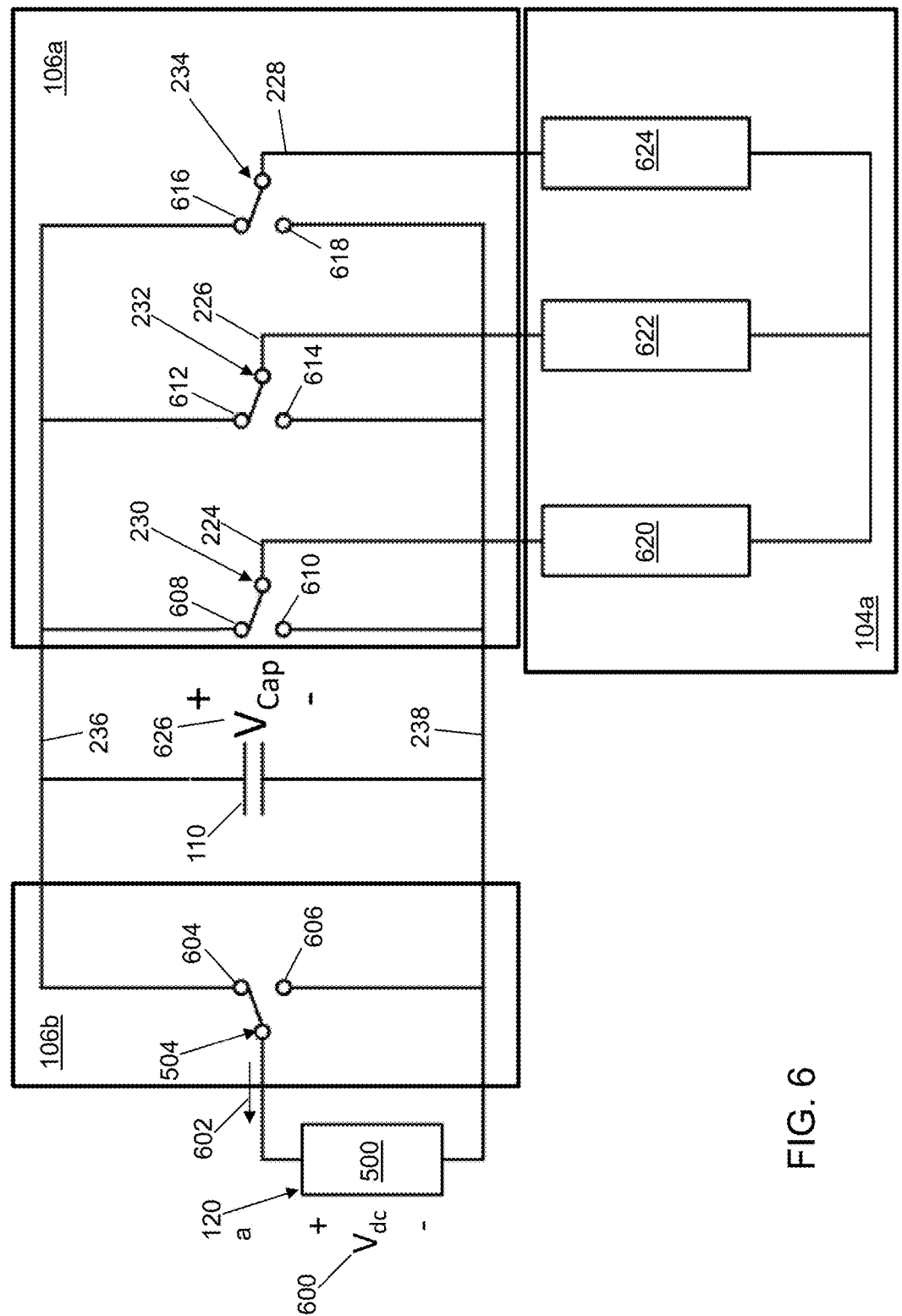
FIG. 6 is a simplified schematic diagram of the first energy transfer system of FIG. 5 in accordance with an illustrative embodiment.

A simplified topology of the circuit diagram of first energy transfer system 100a is shown in FIG. 6. This topology consists of DC and AC sources and loads connected to link capacitor 110 by SPDTs. The circuit topology resembles a DC-DC boost converter cascaded with a three-phase voltage source buck inverter, or a three-phase voltage source boost rectifier cascaded with a DC-DC buck converter. The power transfer can take place from either first source system 102a (DC) to first load system 104a (three-phase AC load) or vice versa. The described techniques can be extended to any number of phases, as well as any number of AC and/or DC systems.

DC power source 500 provides or consumes power operating at a DC voltage $V_{dc}$ 600 and DC current $I_{dc}$ 602 through source control switch 504 shown as an SPDT switch with the 'on' configuration or the one '1' state represented by a connection to a top source throw 604 and the 'off' configuration or the zero '0' state represented by a connection to a bottom source throw 606. First half-bridge 230 is shown as an SPDT switch with the 'on' configuration or the one '1' state represented by a connection to a top first-phase throw 608 and the 'off' configuration or the zero '0' state represented by a connection to a bottom first-phase throw 610. A first-phase output waveform (current, voltage, or power) may be created by operation of first half-bridge 230 and may be referred to as an A-phase waveform input to a first-phase load leg 620.

Second half-bridge 232 is shown as an SPDT switch with the 'on' configuration or the one '1' state represented by a connection to a top second-phase throw 612 and the 'off' configuration or the zero '0' state represented by a connection to a bottom second-phase throw 614. A second-phase output waveform (current, voltage, or power) is created by operation of second half-bridge 232 and may be referred as a B-phase waveform input to a second-phase load leg 622.

Third half-bridge 234 is shown as an SPDT switch with the 'on' configuration or the one '1' state represented by a connection to a top third-phase throw 616 and the 'off' configuration or the zero '0' state represented by a connection to a bottom third-phase throw 618. A third-phase output waveform (current, voltage, or power) is created by operation of third half-bridge 234 and may be referred as a C-phase waveform input to a third-phase load leg 624. As a result, each phase of each source or load can be represented as being connected to an SPDT switch connected in parallel across link capacitor 110 having a capacitor voltage $V_{Cap}$ 626.

Figure 7:
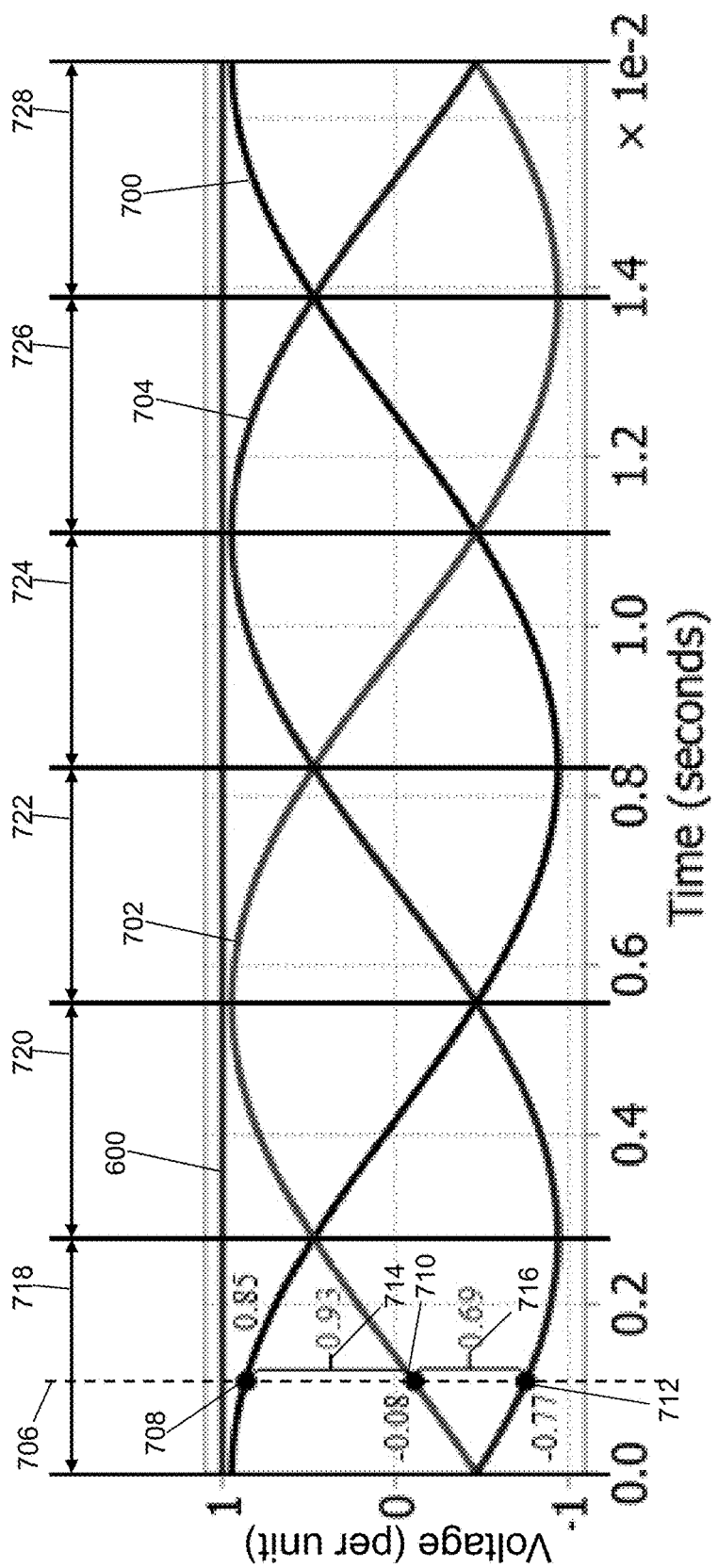
FIG. 7 shows a three-phase balanced set of sinusoidal voltage waveforms in accordance with an illustrative embodiment.
Figure 8:
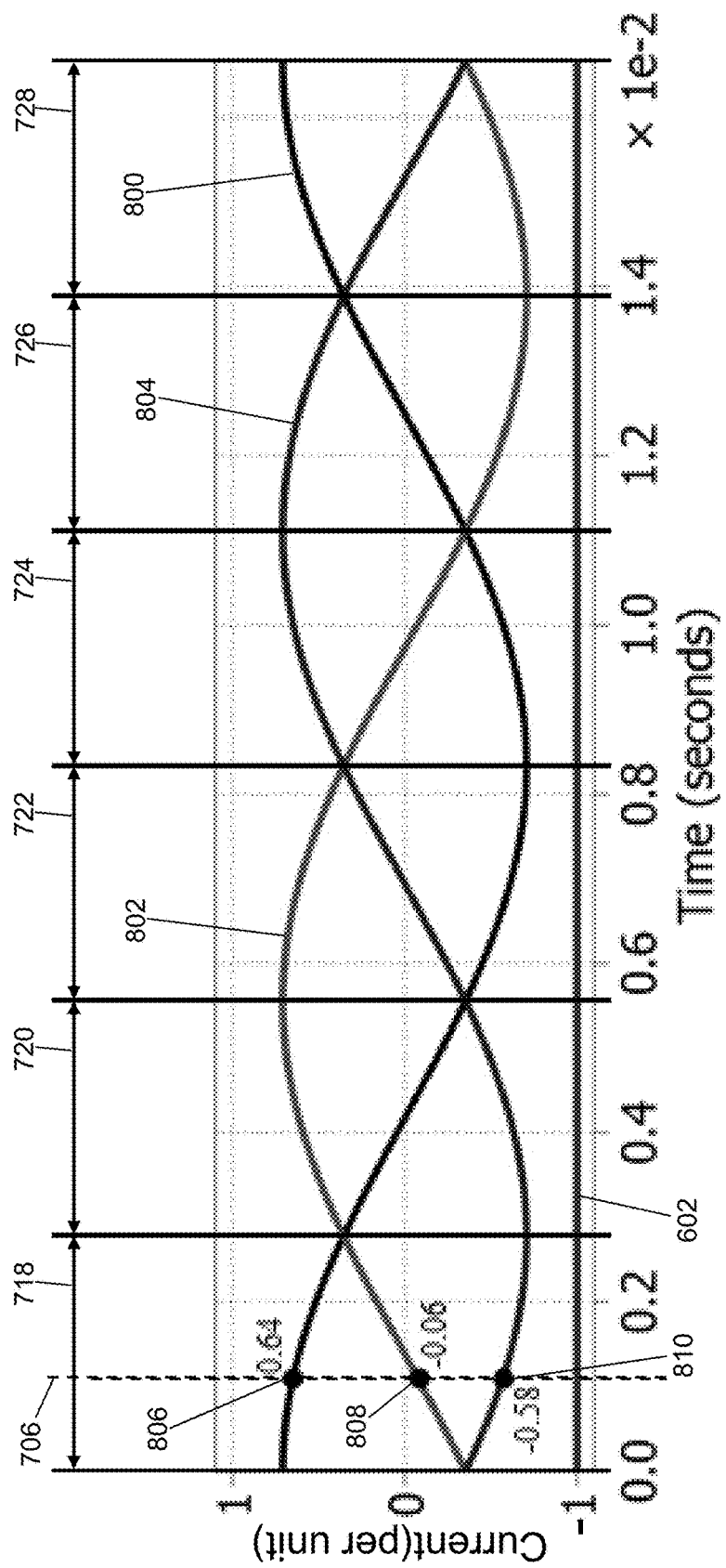
FIG. 8 shows a three-phase balanced set of sinusoidal current waveforms in accordance with an illustrative embodiment.

Referring to FIG. 7, a three-phase balanced set of sinusoidal voltage waveforms at first-phase load leg 620, at second-phase load leg 622, and at third-phase load leg 624 are shown for a complete cycle as a function of time. Referring to FIG. 8, a three-phase balanced set of sinusoidal current waveforms at first-phase load leg 620, at second-phase load leg 622, and at third-phase load leg 624 are shown for the complete cycle. The voltages and currents are shown per unit and at unity power factor for simplicity. DC voltage $V_{dc}$ 600 is shown in FIG. 7. DC current $I_{dc}$ 602 is shown in FIG. 8. DC current $I_{dc}$ 602 is negative because it is flowing out of DC power source 500. A first-phase voltage $V_A$ 700 is provided to first-phase load leg 620 as a function of time. A first-phase current $I_A$ 800 is provided to first-phase load leg 620 as a function of time. A second-phase voltage $V_B$ 702 is provided to second-phase load leg 622 as a function of time. A second-phase current $I_B$ 802 is provided to second-phase load leg 622 as a function of time. A third-phase voltage $V_C$ 704 is provided to third-phase load leg 624 as a function of time. A third-phase current $I_C$ 804 is provided to third-phase load leg 624 as a function of time. As understood by a person of skill in the art, the current and voltage waveforms are 360/m degrees out of phase with each other, where m represents a number of phases. Thus, $V_A$, $V_B$, and $V_C$ are 120 degrees out of phase with each other, and $I_A$, $I_B$, and $I_C$ are 120 degrees out of phase with each other.

At a time instant 706, values for $V_A$, $V_B$, $V_C$, and $I_A$, $I_B$, and $I_C$ may be determined for each phase load leg 620, 622, 624. For example, at time instant 706, a $V_A$ value 708 is 0.85, a $V_B$ value 710 is −0.08, a $V_C$ value 712 is −0.77, an $I_A$ value 806 is 0.64, an $I_B$ value 808 is −0.06, and an $I_C$ value 810 is −0.58. A voltage $V_{AB}$ value 714 is 0.93. A voltage $V_{BC}$ value 716 is 0.69. Voltage $V_{AB}$ is a line-to-line voltage between the A and B phases. Voltage $V_{BC}$ is a line-to-line voltage between the B and C phases.

A time interval of one complete cycle of the three-phase output waveforms can be divided into 6 sectors, depending on which of the phase voltages is the most positive, which of the phase voltages is the most negative, and which of the phase voltages is intermediate between or equal to the most positive and the most negative. For example, in a first sector 718, first-phase voltage $V_A$ 700 is the most positive voltage, third-phase voltage $V_C$ 704 is the most negative voltage, and second-phase voltage $V_B$ 702 has an intermediate voltage. In a second sector 720, second-phase voltage $V_B$ 702 is the most positive voltage, third-phase voltage $V_C$ 704 is the most negative voltage, and first-phase voltage $V_A$ 700 has an intermediate voltage. In a third sector 722, second-phase voltage $V_B$ 702 is the most positive voltage, first-phase voltage $V_A$ 700 is the most negative voltage, and third-phase voltage $V_C$ 704 has an intermediate voltage. In a fourth sector 724, third-phase voltage $V_C$ 704 is the most positive voltage, first-phase voltage $V_A$ 700 is the most negative voltage, and second-phase voltage $V_B$ 702 has an intermediate voltage. In a fifth sector 726, third-phase voltage $V_C$ 704 is the most positive voltage, second-phase voltage $V_B$ 702 is the most negative voltage, and first-phase voltage $V_A$ 700 has an intermediate voltage. In a sixth sector 728, first-phase voltage $V_A$ 700 is the most positive voltage, second-phase voltage $V_B$ 702 is the most negative voltage, and third-phase voltage $V_C$ 704 has an intermediate voltage.

In the illustrative embodiment of FIG. 8, first-phase current $I_A$ 800 is in-phase with first-phase voltage $V_A$ 700, second-phase current $I_B$ 802 is in-phase with second-phase voltage $V_B$ 702, and third-phase current $I_C$ 804 is in-phase with third-phase voltage $V_C$ 704. Depending on a power angle between the currents and voltages of the AC first load system 104a, the phase currents may be in-phase with the phase voltages, may lag the phase voltages, and/or may lead the phase voltages. The power factor may change as a function of time.

The connectivity of the loads and sources can be modeled using a switching function representation of each SPDT switch to the top throw or the bottom throw. The switching function of the various switches can be defined by equation (1):

$$h_k(t) = \begin{cases} 1, & \text{switch } t_{k+} \text{conducts} \\ 0 & \text{switch } t_{k-} \text{conducts} \end{cases} \quad (1)$$

where switch $t_{k+}$ conducts when connected to the top throw, and switch $t_{k-}$ conducts when connected to the bottom throw. In the illustrative embodiment of FIG. 6, k=DC,A,B,C. A switch vector SV={$S_{DC}$, $S_A$, $S_B$, $S_C$} defines a state (e.g., $S_{DC}$, $S_A$, $S_B$, $S_C$) of each switch at a point in time. The three-phase AC quantities can be mapped into two sets of equivalent voltages and currents as described further.

In each sector 718, 720, 722, 724, 726, 728, the most positive voltage $V_p$ may be indicated as a p-phase, the most negative voltage $V_n$ may be indicated as an n-phase, and the intermediate voltage $V_i$ may be indicated as an i-phase. A largest positive line-to-line voltage is between the n-phase and the p-phase waveforms and can be denoted as $V_{pn}$. Two smaller positive line-line voltages are between the intermediate voltage (i-phase) and the maximum voltage waveform (p-phase), and between the intermediate voltage (i-phase) and the minimum voltage (n-phase) voltage waveform, denoted as $V_{pi}$ and $V_{in}$, respectively.

Figure 10:
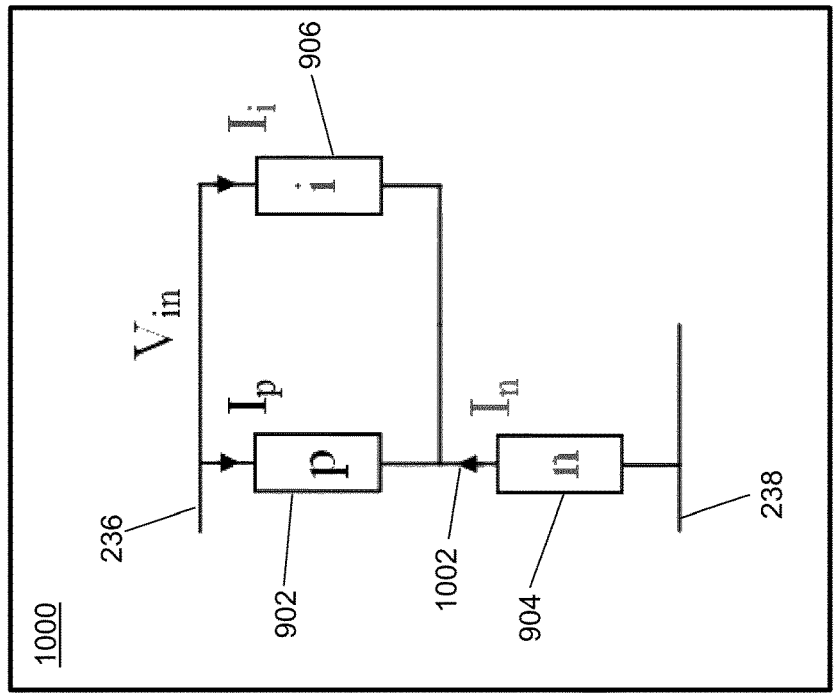
FIG. 10 shows a phase interconnection of switches to synthesize a line-to-line voltage between the intermediate voltage and a most negative voltage of the three phase voltage waveforms of FIG. 7 in accordance with an illustrative embodiment.
Figure 9:
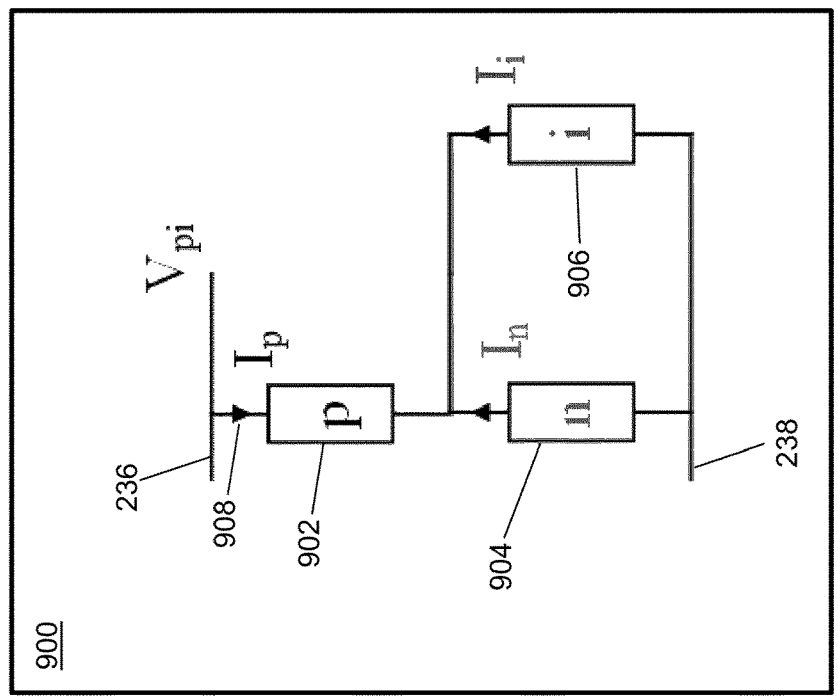
FIG. 9 shows a phase interconnection of switches to synthesize a line-to-line voltage between a most positive voltage and an intermediate voltage of the three phase voltage waveforms of FIG. 7 in accordance with an illustrative embodiment.

$V_A$, $V_B$, and $V_C$ are the AC line-to-neutral voltage waveforms. $V_A$, $V_B$, and $V_C$ at any instant of time (or subcycle) and can be defined using two line-to-line voltage waveforms. During a window of time, synthesis of the two smaller line-to-line voltages of first converter 106a through appropriate modulation results in synthesis of the third line-to-line voltage. To synthesize the two line-to-line voltages, the connection of the three phases to top line (bus) 236 or to bottom line (bus) 238 through the associated SPDT switch is indicated in FIGS. 9 and 10. FIG. 9 shows a p-phase circuit 900 connection to synthesize $V_{pi}$. Since voltage $V_{pi}=V_p-V_i$, a p-phase switch 902 is connected to top bus 236 since p-phase switch 902 provides the maximum voltage, and an i-phase switch 906 is connected to bottom bus 238. An n-phase switch 904 is connected to bottom bus 238, since n-phase switch 904 provides the minimum voltage. In FIG. 9, a p-phase DC link current 908 is $I_p$, since p-phase switch 902 is connected to top bus 236.

Similarly, FIG. 10 shows an n-phase circuit 1000 connection to synthesize $V_{in}$. Since voltage $V_{in}=V_i-V_n$, i-phase switch 906 is connected to top bus 236, while n-phase switch 904 remains connected to bottom bus 238, and p-phase switch 902 remains connected to top bus 236. In FIG. 10, an n-phase DC link current 1002 is $I_n$, since n-phase switch 904 is connected to bottom bus 238.

During a switching period $T_s$, p-phase switch 902 is in the 'on' configuration created by a connection to its top throw 608, 612, 616. n-phase switch 904 is in the 'off' configuration created by a connection to its bottom throw 610, 614, 618. i-phase switch 906 is switched between the 'on' configuration created by a connection to its top throw 608, 612, 616 and the 'off' configuration created by a connection to its bottom throw 610, 614, 618.

As a result, appropriate modulation between the equivalent circuits of FIGS. 9 and 10 enables synthesis of each of $V_A$, $V_B$, and $V_C$. For example, for time instant 706 highlighted in FIG. 7, $V_p=V_A$, $V_n=V_C$, and $V_i=V_B$, because time instant 706 is in first sector 718. Each sector 718, 720, 722, 724, 726, 728 results in different selections for $V_p$, $V_n$, and $V_i$. The difference between first-phase voltage $V_A$ 700 and second-phase voltage $V_B$ 702 gives the line-to-line voltage $V_{pi}=V_{AB}$. Similarly, the difference between second-phase voltage $V_B$ 702 and third-phase voltage $V_C$ 704 gives the line-to-line voltage $V_{in}=V_{BC}$, $I_p=I_A$ and $I_n=-I_C$. For a switching period $T_s$ starting at time instant 706, first half-bridge 230 is in the 'on' configuration by being connected to top first-phase throw 608; third half-bridge 234 is in the 'off' configuration by being connected to bottom third-phase throw 618; and second half-bridge 232 is switched between the 'on' configuration by being connected to top second-phase throw 612 and the 'off' configuration by being connected to bottom second-phase throw 614. Additional numbers of phases may be applied in a similar manner to reduce a number of AC voltages to synthesize by one. For example, three line-to-line voltage can be used to synthesize a four-phase AC system.

Figure 11:
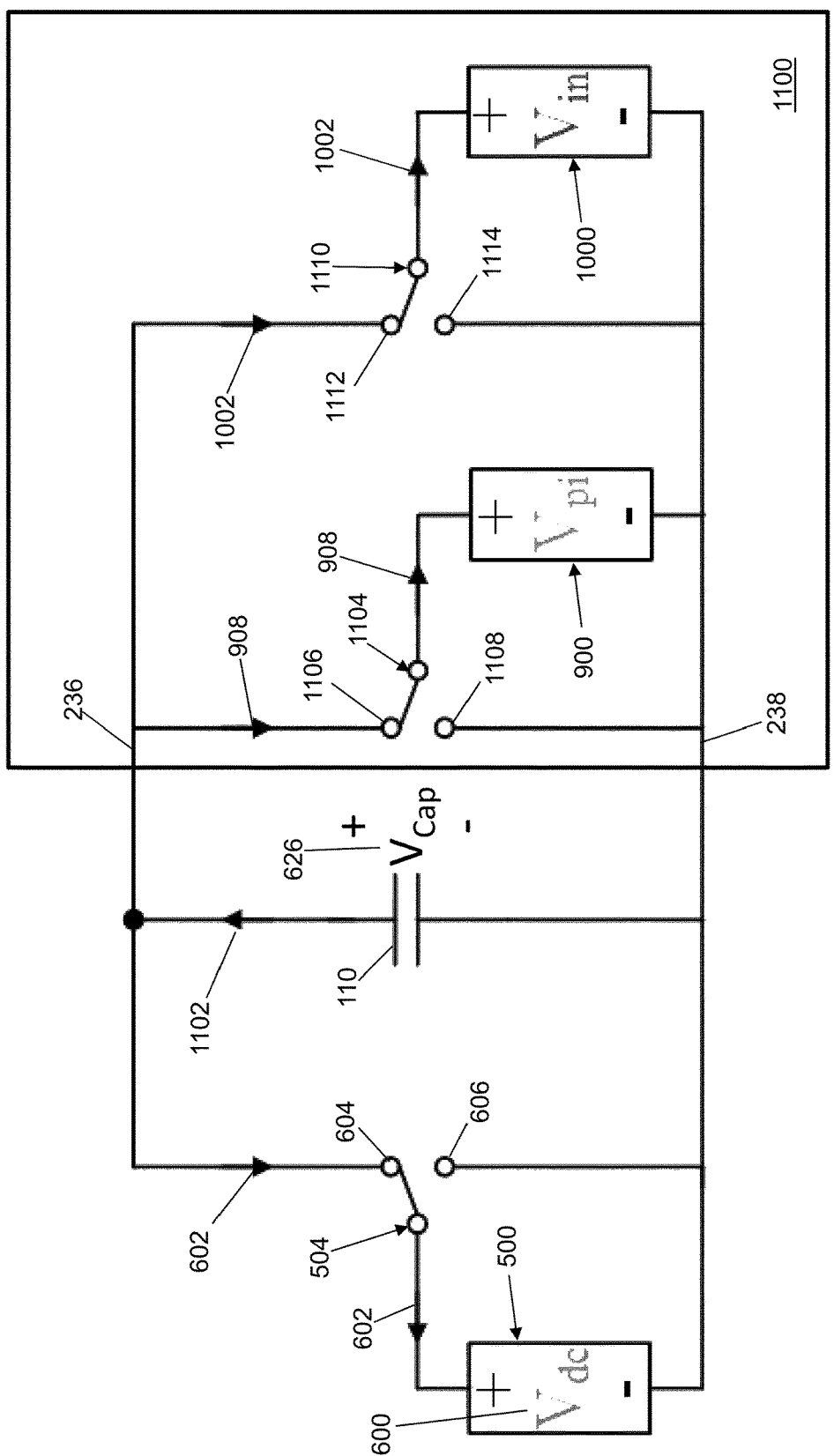
FIG. 11 is a schematic diagram of the first energy transfer system of FIG. 6 with a reduced AC subsystem in accordance with an illustrative embodiment.

As a result, a total number J of "independent" sources and loads connected to link capacitor 110 can be determined. For the DC to three-phase AC converter with one DC voltage source and two independent AC voltages, J=1+2=3. The equivalent currents and voltages of the independent sources and loads can be represented as $I_j$ and $V_j$, respectively, where j=1 to J. Converter 106 that includes first converter 106a and second converter 106b may now be represented by a converter with J independent outputs as illustrated in FIG. 11. The switching state of the various throws connected to these independent sources and/or loads can be defined as shown in equation (2)

$$g_j(t) = \begin{cases} 1, & \text{switch } t_{j+} \text{ conducts} \\ 0 & \text{switch } t_{j-} \text{ conducts} \end{cases} \quad (2)$$

Where $g_j(t)$ defines a reduced switching function when converter 106 includes an AC source or an AC load.

Referring to the illustrative embodiment of FIG. 11, a two-phase circuit 1100 is shown to synthesize $V_{pi}$ using p-phase circuit 900 and to synthesize $V_{in}$ using n-phase circuit 1000. A capacitor current $I_{Cap}$ 1102 flows to/from link capacitor 110 to DC power source 500 and/or to one of p-phase circuit 900 or n-phase circuit 1000. A p-phase circuit switch 1104 switches between the 'on' configuration or the one '1' state represented by a connection to a top p-phase throw 1106 and the 'off' configuration or the zero '0' state represented by a connection to a bottom p-phase throw 1108. An n-phase circuit switch 1110 switches between the 'on' configuration or the one '1' state represented by a connection to a top n-phase throw 1112 and the 'off' configuration or the zero '0' state represented by a connection to a bottom n-phase throw 1114.

Switching functions determine the mapping of the equivalent converter terminal voltages $V_{pi}$ and $V_{in}$ and currents $I_p$ and $I_n$ with DC voltage $V_{dc}$ 600 and DC current $I_{dc}$ 602 through source control switch 504 as $V_j=V_{Cap} \; g_j$ and $I_{Cap}=I_j g_j$, where j=DC, pi, in. The mapping of the $g_j$ switching functions to the $h_k$ switching functions is provided in Table 1 for the illustrative embodiment of FIG. 6.

TABLE 1

| DC | | AC | | | | |
|---|---|---|---|---|---|---|
| $g_{DC}$ | $h_{DC}$ | $g_{pi}$ | $g_{in}$ | $h_p$ | $h_i$ | $h_n$ |
| 0 | 0 | 0 | 0 | 0 | 0 | 0 |
| | | 0 | 1 | 1 | 1 | 0 |
| 1 | 1 | 1 | 0 | 1 | 0 | 0 |
| | | 1 | 1 | 1 | 1 | 1 |

In the case of DC systems (source or load), $g_{DC}(t)$ represents the switching function of the switch connected to them. Hence, $g_{DC}(t)=h_{DC}(t)$. In the case of AC systems, $g_{pi}(t)$ and $g_{in}(t)$ are translated in terms of the switching functions of the three phases $h_p(t)$, $h_i(t)$, and $h_n(t)$, which are mapped to A, B, and C based on the sector 718, 720, 722, 724, 726, 728. As a result, p, i, n∈A, B, C. When $g_{pi}=g_{in}=1$ (or 0), the AC system is in a zero state indicating that $h_p=h_i=h_n=1$ (or 0). As explained previously, during a switching period $T_s$, p-phase switch 902 is in the 'on' configuration created by a connection to its top throw 608, 612, 616 and n-phase switch 904 is in the 'off' configuration created by a connection to its bottom throw 610, 614, 618 resulting in $h_p=1$ and $h_n=0$ as shown in Table 1. When $g_{pi}=1$ and $g_{in}=0$, i-phase switch 906 is in the 'off' configuration created by a connection to its bottom throw 610, 614, 618 resulting in $h_i=0$. When $g_{pi}=0$ and $g_{in}=1$, i-phase switch 906 is in the 'on' configuration created by a connection to its top throw 608, 612, 616 resulting in $h_i=1$.

Conventionally, pulse width modulation (PWM) is posed as a solution to a problem of determining the switching functions $h_k(t)$ for realizing the desired DC and AC terminal voltages at the converter terminals. After such a transformation, the conventional PWM for converters views the modulation problem as a solution to $V_j = V_{Cap} g_j$ to synthesize voltages $V_j$, typically one at a time, such that the switching functions for DC converters and AC converters are determined independent of each other. The consequences of the reciprocal current transfer relationship $I_{Cap} = I_j g_j$ is addressed by using a large link capacitor 110 and long term power balance between the source and load converters that form the converter system.

In contrast, control application 120 simultaneously determines and executes the reduced switching functions $g_j$ such that link capacitor 110 can be connected simultaneously to more than one of the sources and/or loads in a coordinated and coupled manner. Link capacitor 110 undergoes a charge or a discharge cycle during each subcycle $\sigma_i$, by deliberate design so that a stiffness of the DC bus can be maintained with a small amount of energy storage at the DC bus.

During each subcycle, capacitor voltage $V_{cap}$ 626 is reduced if capacitor current $I_{Cap}$ 1102 is positive; whereas, capacitor voltage $V_{Cap}$ 626 increases if capacitor current $I_{Cap}$ 1102 is negative. Under normal operating conditions, capacitor voltage $V_{Cap}$ 626 is maintained at nominal capacitor voltage value $V_N$ at a start and at an end of each switching period $T_s$. The sequence and pattern of connecting the various sources and loads can be formulated in various ways depending on constraints applied to select a switch vector during each subcycle.

Figure 12B:
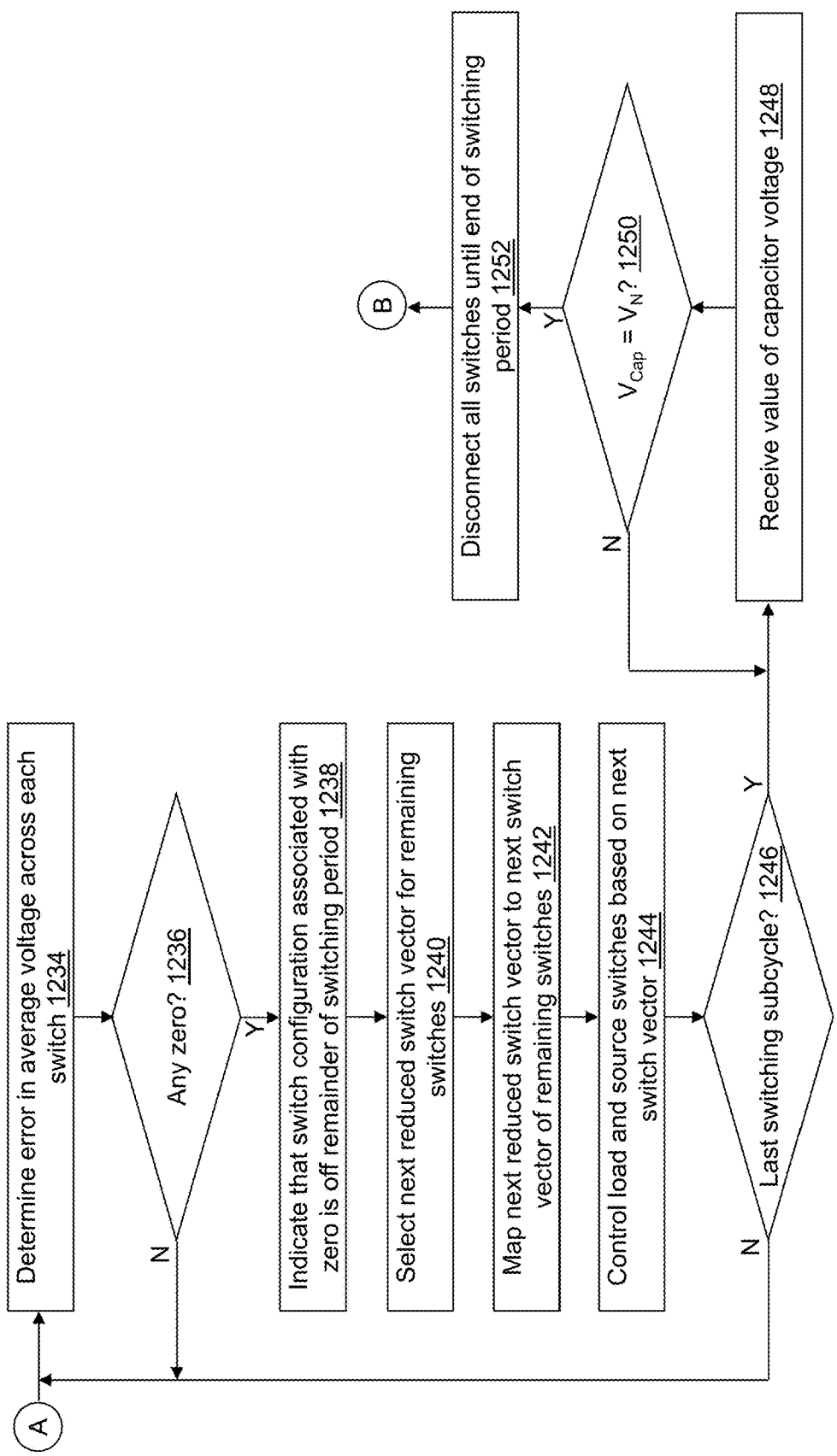

Referring to FIGS. 12A and 12B, example operations associated with control application 120 are described. Control application 120 may control converter 106 operating as a DC-AC inverter, a DC-AC rectifier, a DC-DC converter, or an AC-AC converter with any number of loads and sources. Additional, fewer, or different operations may be performed depending on the embodiment. The order of presentation of the operations of FIGS. 12A and 12B is not intended to be limiting. Although some of the operational flows are presented in sequence, the various operations may be performed in various repetitions, concurrently, and/or in other orders than those that are illustrated. As understood by a person of skill in the art, various operations may be performed in parallel, for example, using a plurality of threads or a plurality of processors.

In an operation 1200, nominal capacitor voltage value $V_N$ is determined. For example, nominal capacitor voltage value $V_N$ may be determined by receiving nominal capacitor voltage value $V_N$ after a selection from a user interface window or after entry by a user into a user interface window presented under control of control application 120. As another example, nominal capacitor voltage value $V_N$ may be determined by reading nominal capacitor voltage value $V_N$ from a storage location in computer-readable medium 116. As still another example, nominal capacitor voltage value $V_N$ may be determined by receiving a measurement from converter 106. As yet another example, nominal capacitor voltage value $V_N$ may be determined by reading nominal capacitor voltage value $V_N$ from a command line that triggers execution of control application 120.

In an operation 1202, switching frequency $f_s$ is determined. For example, switching frequency $f_s$ may be determined by receiving switching frequency $f_s$ after a selection from a user interface window or after entry by a user into a user interface window presented under control of control application 120. As another example, switching frequency $f_s$ may be determined by reading switching frequency $f_s$ from a storage location in computer-readable medium 116. As still another example, switching frequency $f_s$ may be determined by reading switching frequency $f_s$ from a command line that triggers execution of control application 120.

In an operation 1204, switching period $T_s$ is computed from switching frequency $f_s$ as $T_s = 1/f_s$. Alternatively, switching period $T_s$ may be determined in operation 1202, and switching frequency $f_s$ may be computed as $f_s = 1/T_s$ in operation 1204.

In an operation 1206, capacitance value C of link capacitor 110 is received. For example, capacitance value C may be received after a selection from a user interface window or after entry by a user into a user interface window presented under control of control application 120. As another example, capacitance value C may be received by reading capacitance value C from a storage location in computer-readable medium 116. As still another example, capacitance value C may be received by reading capacitance value C from a command line that triggers execution of control application 120.

In an operation 1208, a source type and a source rating of one or more sources is received. For example, a source type may be indicated as either DC or AC. If AC, the source type further may indicate a number of phases and the operating frequency. The source rating may be a maximum voltage value, a maximum current, and/or a maximum power. The type and rating of the one or more sources may be received after a selection from a user interface window or after entry by a user into a user interface window presented under control of control application 120. As another example, the type and rating of the one or more sources may be received by reading the type and rating of the one or more sources from a storage location in computer-readable medium 116. As still another example, the type and rating of the one or more sources may be received by reading the type and rating of the one or more sources from a command line that triggers execution of control application 120.

In an operation 1210, a load type and a load rating of one or more loads is received. For example, a load type may be indicated as either DC or AC. If AC, the load type further may indicate a number of phases and the operating frequency. The load rating may be a maximum voltage value, a maximum current, and/or a maximum power. The type and rating of the one or more loads may be received after a selection from a user interface window or after entry by a user into a user interface window presented under control of control application 120. As another example, the type and rating of the one or more loads may be received by reading the type and rating of the one or more loads from a storage location in computer-readable medium 116. As still another example, the type and rating of the one or more loads may be received by reading the type and rating of the one or more loads from a command line that triggers execution of control application 120.

In an operation 1212, one or more switch state selection modes are received. For example, the one or more switch state selection modes may be received after a selection from a user interface window or after entry by a user into a user interface window presented under control of control application 120. As another example, the one or more switch state selection modes may be received by reading the one or more switch state selection modes from a storage location in computer-readable medium 116. As still another example, the one or more switch state selection modes may be received by reading the one or more switch state selection modes from a command line that triggers execution of control application 120. In an alternative embodiment, the switch state selection mode may not be selectable such that control application 120 implements a predefined switch state selection mode.

If a plurality of switch state selection modes are received, an order of application is defined. For example, each switch state selection mode may be applied in the order listed or in an order indicated by a numerical value associated with each switch state selection mode. Illustrative switch state selection modes include "minimize a capacitor voltage ripple", "minimize switch state changes", "minimize a capacitor voltage deviation", "minimize a capacitor current", etc. Of course, the switch state selection modes may be labeled or selected in a variety of different manners by the user as understood by a person of skill in the art.

A switch state selection mode that minimizes a capacitor voltage ripple selects reduced switching functions $g_j$ for each subcycle that result in a minimum capacitor voltage ripple across link capacitor 110 such that $J_C=\text{Min}[\Delta V_{cap\text{-}ripple}]$. Minimization of the capacitor ripple voltage in a subcycle may be achieved by minimizing a capacitor power input or capacitor power output. For example, assume that link capacitor 110 is at nominal capacitor voltage value $V_N$. Let capacitor current $I_{Cap}$ 1102 and an average of capacitor voltage $V_{Cap}$ 626 across link capacitor 110 during subcycle Q be $I_{CapQ}$ and $V_{CapQ}$, respectively. Let capacitor voltage $V_{Cap}$ 626 across link capacitor 110 after a charge/discharge cycle be $V_p$. Equations (3) and (4) provide a quantitative representation of capacitor current $I_{Cap}$ 1102 and capacitor voltage $V_{Cap}$ 626

$$I_{CapQ} = -C\frac{dV_C}{dt} = -C\frac{V_P - V_N}{d_Q T_S} \quad (3)$$

$$V_{CapQ} = d_Q \frac{V_P + V_N}{2} \quad (4)$$

where $d_Q$ is a duty ratio during subcycle Q.

Combining equations (3) and (4) results in $$V_P^2 = -\frac{2V_{CapQ}I_{CapQ}}{Cf_s} + V_N^2.$$

Assuming that $V_N$, C, and $f_s$ are constant during a subcycle, the voltage $V_P$ and therefore, the capacitor voltage ripple $V_P$-$V_N$ is determined by the product $V_{CapQ}I_{CapQ}$, which is the power throughput into link capacitor 110 in that subcycle.

A switch state selection mode that minimizes switch state changes minimizes a number of switch state changes each subcycle to less than or equal to a predefined maximum number of switch state changes per subcycle $M_S$.

A switch state selection mode that minimizes a capacitor voltage deviation from nominal capacitor voltage value $V_N$ leads to less variation in capacitor voltage $V_{Cap}$ 626 and avoids a high bus voltage. In general, minimizing a capacitor voltage deviation from nominal capacitor voltage value $V_N$ may be achieved by alternating between a charge and a discharge cycle of link capacitor 110 leading to alternative negative and positive values for capacitor current $I_{Cap}$ 1102. A positive value for capacitor current $I_{Cap}$ 1102 leads to a discharge cycle and vice versa.

A switch state selection mode that minimizes a capacitor current selects a switch vector that achieves a minimum capacitor current $I_{Cap}$ 1102 through link capacitor 110 each subcycle.

In an operation 1214, a determination is made concerning whether or not the one or more switch state selection modes include "minimize switch state changes". When the one or more switch state selection mode includes "minimize switch state changes", processing continues in an operation 1216. When the one or more switch state selection mode does not include "minimize switch state changes", processing continues in an operation 1218.

In operation 1216, a first indicator of maximum number of switch state changes per subcycle $M_S$ may be received. For example, the first indicator may be received after a selection from a user interface window or after entry by a user into a user interface window presented under control of control application 120. As another example, maximum number of switch state changes per subcycle $M_S$ may be received by reading maximum number of switch state changes per subcycle $M_S$ from a storage location in computer-readable medium 116. As still another example, maximum number of switch state changes per subcycle $M_S$ may be received by reading maximum number of switch state changes per subcycle $M_S$ from a command line that triggers execution of control application 120. In an alternative embodiment, $M_S$ may not be selectable. Instead, a fixed, predefined value may be used. $M_S$ is at least two and may be defined based on the number of independent loads and sources.

In operation 1218, a number of switching subcycles $J_{LS}=J_L+J_s$ is determined by computing the total number of "independent" sources and loads connected to link capacitor 110 based on the load type of the one or more loads and the source type of the one or more sources as discussed previously. Within a switching period, additional idle subcycles may be included in addition to the determined number of switching subcycles. To determine the number of switching subcycles $J_{LS}$, when the load type is AC, $J_L=\Sigma_{i=1}^{N_{ACL}}(N_{\emptyset Li}-1)$, where $N_{ACL}$ is a number of AC load circuits of the one or more loads and $N_{\emptyset Li}$ is a number of load phases of a respective AC load circuit. When the load type is DC, $J_L=N_{DCL}$, where $N_{DCL}$ is a number of DC load circuits of the one or more loads. Similarly, when the source type is AC, $J_S=\Sigma_{i=1}^{N_{ACS}}(N_{\emptyset Si}-1)$, where $N_{ACS}$ is a number of AC source circuits of the one or more sources and $N_{\emptyset Si}$ is a number of source phases of a respective AC source circuit. When the source type is DC, $J_S=N_{DCS}$, where $N_{DCS}$ is a number of DC source circuits of the one or more sources. There may be a combination of AC sources and DC sources. In that case, $J_S=\Sigma_{i=1}^{N_{ACS}}(N_{\emptyset Si}-1)+N_{DCS}$. Similarly, there may be a combination of AC loads and DC loads. In that case, $J_L=\Sigma_{i=1}^{N_{ACL}}(N_{\emptyset i}-1)+N_{DCL}.$]

In an operation 1220, load values of a load voltage and a load current are received for each of the one or more loads. For example, the load values may be read from computer-readable medium 116 or received as electrical signals from sensors mounted to the one or more loads. The load voltage values or the load current values or both may also be estimated using load models.

In an operation 1222, when the load type is AC, the sector is determined based on the received load values for the load voltages, and each phase A, B, and C is allocated to p, i, and n in the case of a three-phase AC load type.

In an operation 1224, source values of a source voltage and a source current are received for each of the one or more sources. For example, the source values may be read from computer-readable medium 116 or received as electrical signals from sensors mounted to the one or more sources. The source voltage values or the source current values or both may also be estimated using source models.

In an operation 1226, when the source type is AC, the sector is determined based on the received source values for the source voltages, and each phase A, B, and C is allocated to p, i, and n in the case of a three-phase AC source type.

In an operation 1228, a first reduced switch vector is selected based on the switch state selection mode(s). The first reduced switch vector defines a reduced switching function $g_j$ for each of $J_{LS}$ switches for a first subcycle Q=1 of a current switching period having a start time $T_N$. For example, in the illustrative embodiment of FIG. 11, the first reduced switch vector defines a switch state for source control switch 504, p-phase circuit switch 1104, and n-phase circuit switch 1110. For example, if source control switch 504 and p-phase circuit switch 1104 are in the 'on' configuration and n-phase circuit switch 1110 is in the 'off' configuration, first reduced switch vector is {1,1,0}.

In an operation 1230, the selected first reduced switch vector is mapped to a first switch vector that defines switching function $h_k$ from reduced switching function $g_j$, for example, using Table 1 for the illustrative embodiment of FIG. 6. If the source type is DC and the load type is DC, there is no reduced switch vector so the switch vector is selected in operation 1228 and operation 1230 is not performed. First switch vector defines a switch state or configuration for each load switch of the one or more loads and each source switch of the one or more sources. For example, in the illustrative embodiment of FIG. 6, the first switch vector defines a switch state for each of k=DC, A, B, C. For example, if source control switch 504 and first half-bridge 230 are in the 'on' configuration and second half-bridge 232 and third half-bridge 234 are in the 'off' configuration, first switch vector is {1,1,0,0}.

In an operation 1232, the load and source switches (e.g. source control switch 504, first half-bridge 230, second half-bridge 232, and third half-bridge 234) are controlled based on the switch state defined by the first switch vector. For example, gating signals are sent to each transistor switch 300 of each half-bridge 230, 232, 234 and of source control switch 504 to control each switch to the 'on' or 'off' configuration indicated by the first switch vector.

Referring to FIG. 12B, in an operation 1234, an error in average voltage across each load and source switch may be determined based on equation (5a) using the electrical signals from the voltage sensors mounted on link capacitor 110

$$e_j = V_j^* - \Sigma_{Q=1}^{J_{LS}} (\int_{T_N}^{t} g_{jQ} v_{Cap} dt) \quad (5a)$$

where j=DC, pi, in in the illustrative embodiment of FIG. 11 such that $g_{DC1}$ is the reduced switch vector of source DC during first subcycle, $g_{DC2}$ is a reduced switch vector of source DC during second subcycle, $g_{DC3}$ is a reduced switch vector of source DC during third subcycle, and $V_{DC}^*$ is the associated desired voltage. The error in average voltage across each load and source switch may also be determined by directly using the electrical signals from the voltage sensors mounted on the loads and sources by using equation (5b)

$$e_j = V_j^* - \int_{T_N}^{t} V_j^m dt \quad (5b)$$

where, $V_j^m$ is the voltage measured across the source or load j. When j=DC, electrical signals from the voltage sensors mounted on the DC source is used. When j=pi, in, electrical signals from the voltage sensors mounted on the AC load line-line terminals are appropriately selected and used. For example, at time instant 706 of FIG. 7, the electrical signals from $V_{AB}^m$ and $V_{BC}^m$ are used in equation (5b) as pi=AB and in =BC In an operation 1236, a determination is made concerning whether or not any error in average voltage is zero. When an error in average voltage is not zero, processing continues in operation 1234 until an error in average voltage is zero. When an error in average voltage is zero, processing continues in an operation 1238. For example, the determination is whether or not any of $e_{DC}$, $e_{pi}$, or $e_{in}$ has reached zero based on the switch vector.

In operation 1238, the switch associated with the average voltage reaching zero is indicated as in the 'off' configuration a remainder of the current switching period. For example, a switch configuration of j=DC, pi, in is indicated as 'off' because the source or the load circuit associated with the switch has reached its required average voltage.

In an operation 1240, a next reduced switch vector is selected based on the switch state selection mode(s). Q may be incremented, Q=Q+1. The next reduced switch vector defines a reduced switching function $g_Q$ for each of the remaining switches (not indicated as in the 'off' configuration in operation 1238) for a next subcycle Q of the current switching period.

In an operation 1242, the selected next reduced switch vector is mapped to a next switch vector that defines switching function $h_k$ from reduced switching function $g_j$. Again, if the source type is DC and the load type is DC, there is no reduced switch vector so the switch vector for switching function $h_k$ is selected in operation 1240 and operation 1242 is not performed.

In an operation 1244, the load and source switches (e.g. source control switch 504, first half-bridge 230, a second half-bridge 232, and third half-bridge 234) are controlled based on the switch state defined by the next switch vector selected in operation 1242.

In an operation 1246, a determination is made concerning whether or not a last switching subcycle is the next subcycle. When the last switching subcycle is the next subcycle, processing continues in an operation 1248. When the last switching subcycle is not the next subcycle, processing continues in operation 1234. For example, the determination is whether or not Q=$J_{LS}$.

In operation 1248, capacitor voltage $V_{Cap}$ 626 is received. For example, capacitor voltage $V_{Cap}$ 626 is received as an electrical signal from a voltage sensor that measures the voltage between top bus 236 and bottom bus 238.

In an operation 1250, a determination is made concerning whether or not capacitor voltage $V_{Cap}$ 626 is equal to nominal capacitor voltage value $V_N$. When $V_{Cap}$=$V_N$, processing continues in an operation 1252. When $V_{Cap}$≠$V_N$, processing continues in operation 1248 until $V_{Cap}$=$V_N$.

In operation 1252, the load and source switches (e.g. source control switch 504, first half-bridge 230, a second half-bridge 232, and third half-bridge 234) are all disconnected or set to the 'off' configuration until an end of the switching period defined as $T_N+T_s$, and processing continues in operation 1220 to continue to operate converter 106 to provide the load voltages and currents for the next switching period $T_N=T_N+T_s$.

The end of the subcycles may be implemented dynamically by monitoring the error in desired average voltages. Alternatively, the sequence for each subcycle can be determined a priori for a complete cycle. For example, for a predetermined switch state selection mode(s), the switch vector for each subcycle for each switching period of the complete AC switching frequency cycle can be computed and saved to switch sequence data 1312. Instead of computing the switch vectors as in FIGS. 12A and 12B, the switch vectors can be read from switch sequence data 1312 and the duration times can be calculated depending on the instant of operation and applied to converter 106. Switch sequence data 1312 may include a plurality of rows and a plurality of columns with each row defining a switch vector that is applied. With a fixed switching state sequence, instead of computing error voltages, duty ratios can be calculated depending on the instant of time of the operation. Active calculation of duty ratios can incorporate non steady-state conditions as well.

Figure 13:
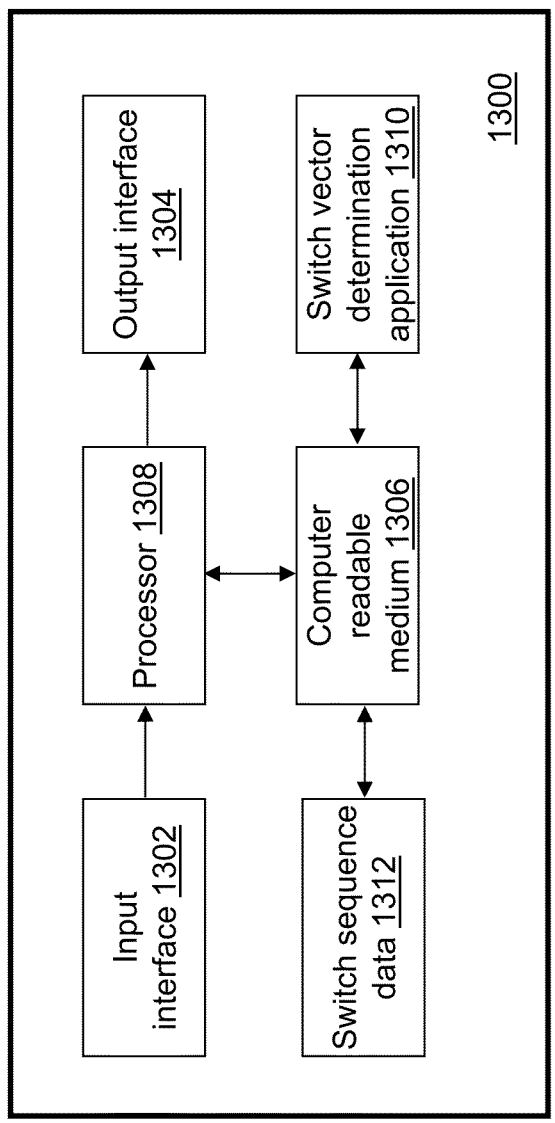
FIG. 13 is a block diagram of a switch vector determination device in accordance with an illustrative embodiment.

Referring to FIG. 13, a block diagram of a switch vector determination device 1300 is shown in accordance with an illustrative embodiment. Switch vector determination device 1300 may include a second input interface 1302, a second output interface 1304, a second non-transitory computer-readable medium 1306, a second processor 1308, a switch vector determination application 1310, and switch sequence data 1312. Fewer, different, and/or additional components may be incorporated into switch vector determination device 1300.

Second input interface 1302 provides the same or similar functionality as that described with reference to input interface 112 of controller 108 though referring to switch vector determination device 1300. Second output interface 1304 provides the same or similar functionality as that described with reference to output interface 114 of controller 108 though referring to switch vector determination device 1300. Second computer-readable medium 1306 provides the same or similar functionality as that described with reference to computer-readable medium 116 of controller 108 though referring to switch vector determination device 1300. Second processor 1308 provides the same or similar functionality as that described with reference to processor 118 of controller 108 though referring to switch vector determination device 1300.

Switch vector determination application 1310 performs operations associated with computing the switch vectors as in FIGS. 12A and 12B except outputting the computed switch vectors to switch sequence data 1312 instead of dynamically controlling the switch states. The operations may be implemented using hardware, firmware, software, or any combination of these methods.

Referring to the example embodiment of FIG. 13, switch vector determination application 1310 is implemented in software (comprised of computer-readable and/or computer-executable instructions) stored in second computer-readable medium 1306 and accessible by second processor 1308 for execution of the instructions that embody the operations of switch vector determination application 1310. Switch vector determination application 1310 may be written using one or more programming languages, assembly languages, scripting languages, etc.

Figure 14A:
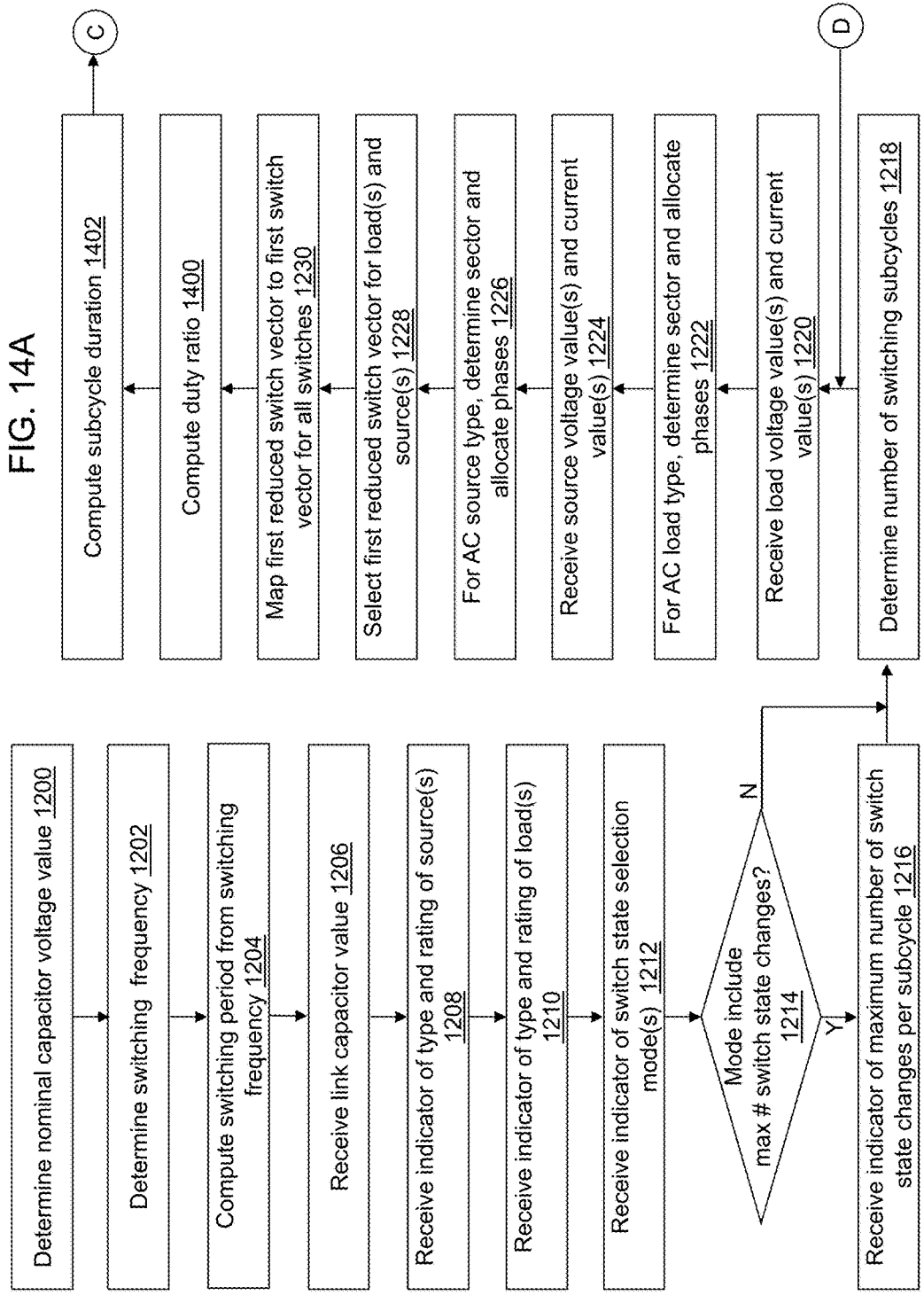
FIGS. 14A and 14B depict a flow diagram illustrating examples of operations performed by a switch vector determination application of the switch vector determination device of FIG. 13 in accordance with an illustrative embodiment
Figure 14B:
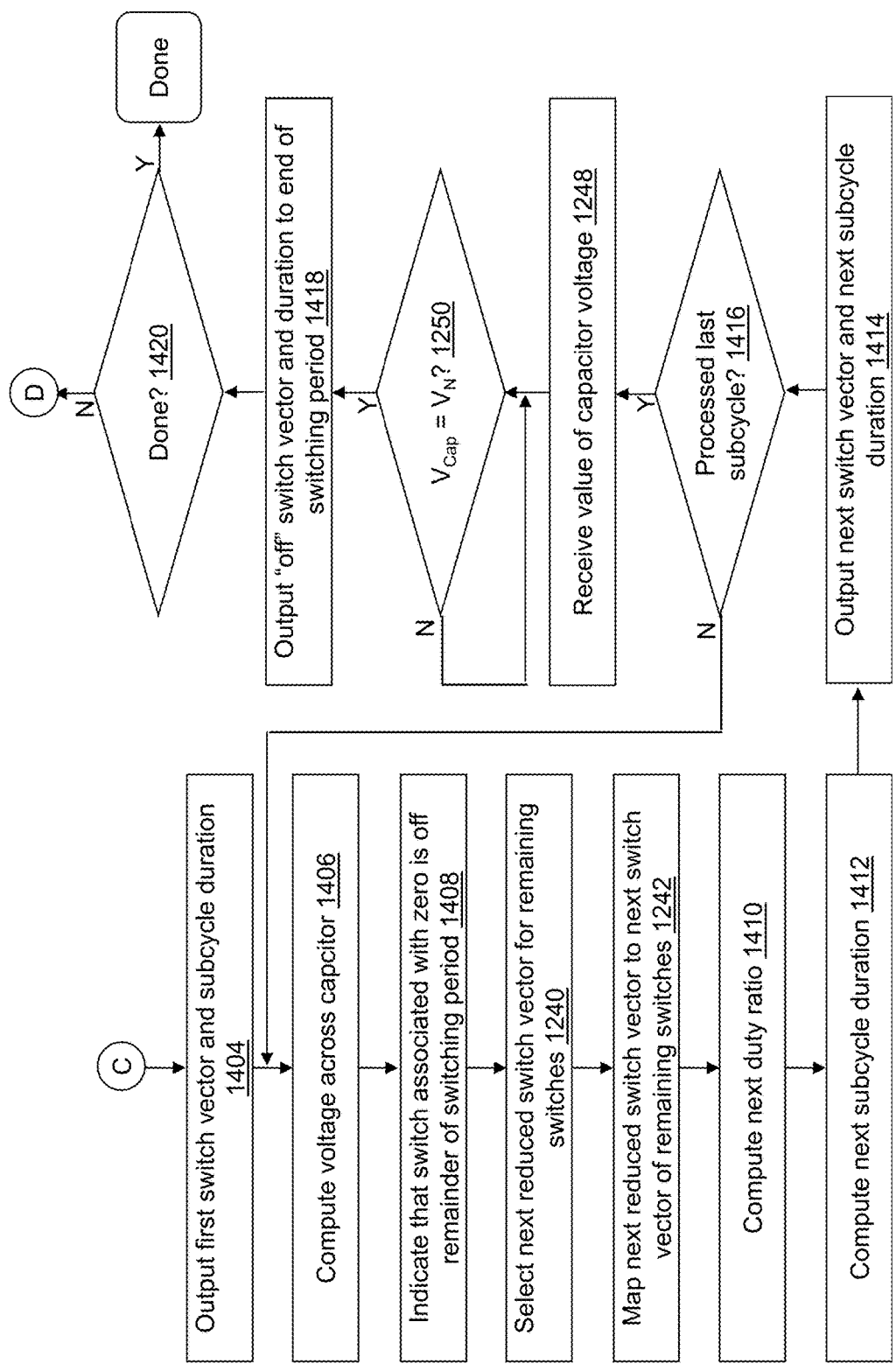

Referring to FIGS. 14A and 14B, example operations associated with switch vector determination application 1310 are described. Switch vector determination application 1310 may determine switch vectors and a subcycle duration for each switch vector as a function of time when the operating conditions of the source circuits and the load circuits are known. The determined switch vectors are stored to switch sequence data 1312. Additional, fewer, or different operations may be performed depending on the embodiment. The order of presentation of the operations of FIGS. 14A and 14B is not intended to be limiting. Although some of the operational flows are presented in sequence, the various operations may be performed in various repetitions, concurrently, and/or in other orders than those that are illustrated. As understood by a person of skill in the art, various operations may be performed in parallel, for example, using a plurality of threads or a plurality of processors.

Switch vector determination application 1310 may include operations 1200 to 1230 described with reference to FIG. 12A.

After operation 1230, in an operation 1400, a duty ratio is computed. Let the duty ratio during subcycle Q be $d_Q$. Let the equivalent current in link capacitor 110 during subcycle Q be $I_{eQ}$. Let the equivalent voltage in link capacitor 110 during subcycle Q be $V_{eQ}$. Let the power throughput in the capacitor during subcycle Q be $P_{eQ} = V_{eQ} I_{eQ}$. During the first subcyle Q=1, $$I_{e1} = C\frac{dv_c}{dt} = C\frac{V_N - V_{P1}}{d_1 T_S} \qquad (6)$$

$$P_{e1} = \frac{1}{T_S}\frac{1}{2}C[V_N^2 - V_{P1}^2] \qquad (7)$$

where $v_c$ is the capacitor voltage, and $V_{P1}$ is a capacitor voltage after the first subcyle. $V_{P1}$ can be eliminated from equations (6) and (7) to obtain an expression for the duty ratio $$d_1 = \frac{Cf_s}{I_{e1}}\left[V_N - \sqrt{V_N^2 - \frac{2V_{e1}I_{e1}}{Cf_s}}\right]$$

$V_{P1}$ can be determined using $$V_{P1} = V_N - \frac{d_1 T_S I_{e1}}{C}.$$

Each subcycle has the same type of capacitor charge/discharge cycle as the first subcycle. Hence, the $d_1$ expression can be generalized for subsequent subcycle as provided in equation (8), $$d_Q = \frac{Cf_s}{I_{eQ}}\left[V_{NQ} - \sqrt{\frac{V_{NQ}^2 - 2V_{eQ}I_{eQ}}{Cf_s}}\right] \qquad (8)$$

where the final voltage of subcycle Q or the starting voltage for the next subcycle Q+1, ($V_{P1}$ in the above case) can be determined using $$V_{N(Q+1)} = V_{NQ} - \frac{d_Q T_S I_{eQ}}{C} \qquad (9)$$

where $V_{eQ}$ is the lesser of the two voltages in the $Q^{th}$ capacitor charge/discharge cycle.

In an operation 1402, a subcycle duration is computed as an inverse of the computed duty ratio times the switching frequency $f_S$.

In an operation 1404, the first switch vector and the computed subcycle duration are output to switch sequence data 1312.

In an operation 1406, a voltage across the capacitor after the end of the subcycle is computed using equation (9).

Similar to operation 1238, in an operation 1408, the switch associated with the computed voltage reaching zero is indicated as in the 'off' configuration a remainder of the current switching period.

After operation 1408, switch vector determination application 1310 may include operations 1240 and 1242 described with reference to FIG. 12B.

After operation 1242, in an operation 1410, the duty ratio for a next subcycle is computed using equation (8).

In an operation 1412, a subcycle duration for the next subcycle is computed as an inverse of the computed next duty ratio times the switching frequency $f_S$.

In an operation 1414, the next switch vector and the computed next subcycle duration are output to switch sequence data 1312.

After operation 1414, switch vector determination application 1310 may include operations 1248 and 1250 described with reference to FIG. 12B except when $V_{Cap}=V_N$, processing continues in an operation 1418.

In an operation 1416, a determination is made concerning whether or not the last switching subcycle has been processed. When the last switching subcycle has been processed, processing continues in operation 1406. When the last switching subcycle has not been processed, processing continues in operation 1418. For example, the determination is whether or not $Q>J_{LS}$.

In operation 1418, the subcycle duration is computed from the current time to the end of the switching period and the 'off' switch vector and subcycle duration are output to switch sequence data 1312.

In an operation 1420, a determination is made concerning whether or not the complete AC operating frequency cycle has been processed. When the complete cycle has been processed, processing is done. When the complete cycle has not been processed, processing continues in operation 1220 of FIG. 14A to compute the switch vectors for the next switching period. For example, FIG. 6 shows a complete voltage cycle for a three-phase AC system. The next cycle is a repetition of the complete cycle.

Figure 15:
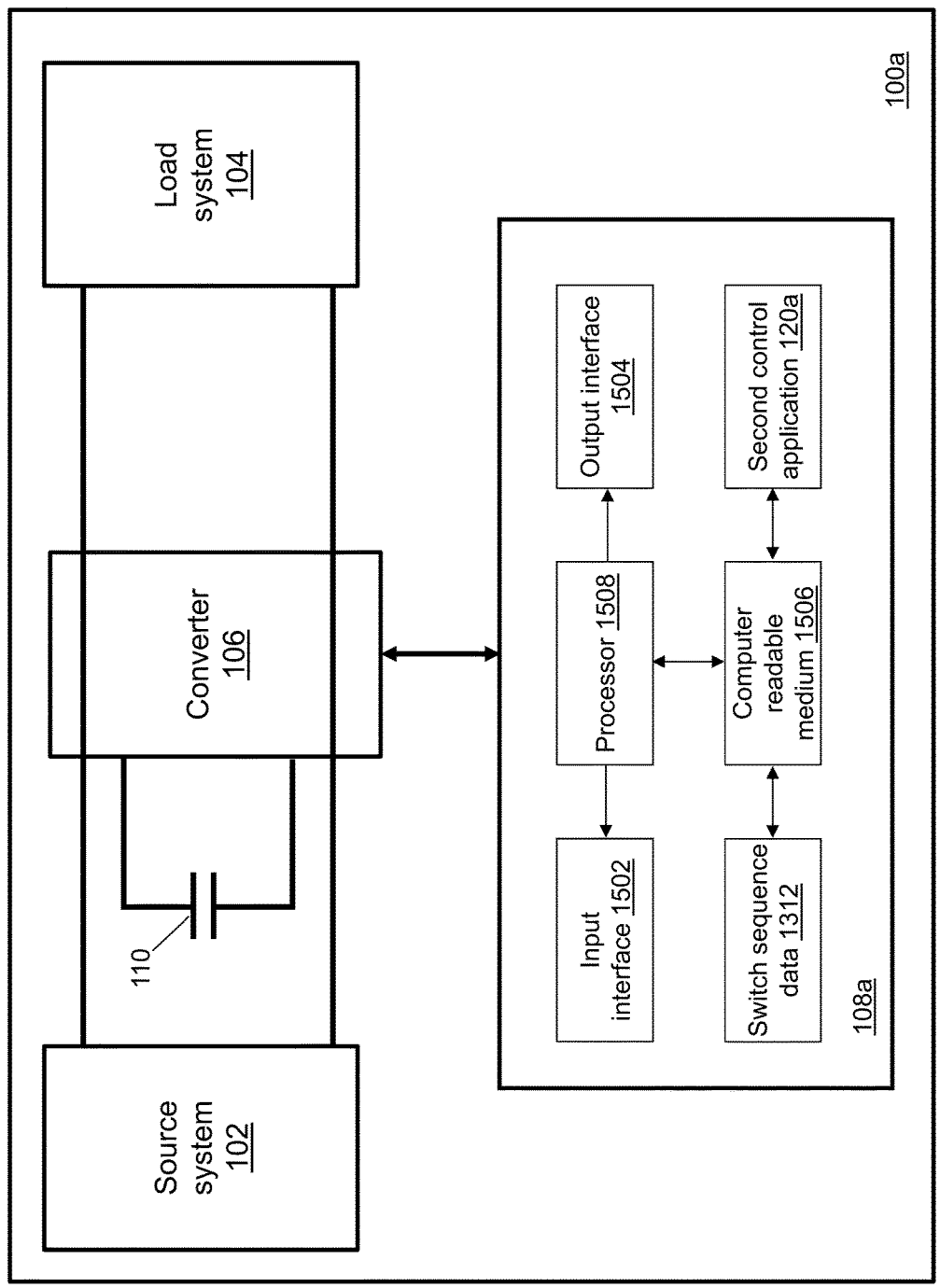
FIG. 15 is a block diagram of a second energy transfer system in accordance with an illustrative embodiment.

Referring to FIG. 15, a block diagram of a second energy transfer system 100a is shown in accordance with a second illustrative embodiment. Second energy transfer system 100a may include source system 102, load system 104, converter 106, a second controller 108a, and link capacitor 110. Switch vector determination device 1300 may be integrated with second controller 108a. Switch vector determination device 1300 and second controller 108a further may be integrated with energy transfer system 100. For example, for a first complete cycle, control application 120 may determine the switch vectors dynamically as described with reference to FIGS. 12A and 12B. In this embodiment, control application 120 controls the switch states and outputs the switch vectors with a subcycle duration for each switch vector to switch sequence data 1312 as described in operations 1400, 1402, 1404, 1410, 1412, and 1414 referring to FIGS. 14A and 14B. Subsequent cycles may be implemented using second controller 108a.

Second controller 108a may control converter 106 to act as an inverter, a rectifier, and/or a frequency converter. Second controller 108a is electrically connected to converter 106. Second controller 108a controls the supply of power from source system 102 to load system 104 through command signals input to converter 106. The command signals are generated by second controller 108a based on switch vectors read from switch sequence data 1312.

Second controller 108a may include a third input interface 1502, a third output interface 1504, a third computer-readable medium 1506, a third processor 1508, a second control application 120a, and switch sequence data 1312. Fewer, different, and additional components may be incorporated into second controller 108a. For example, second controller 108a may include a communication interface (not shown).

Third input interface 1502 provides the same or similar functionality as that described with reference to input interface 112 of controller 108 though referring to second controller 108a. Third output interface 1504 provides the same or similar functionality as that described with reference to output interface 114 of controller 108 though referring to second controller 108a. Third computer-readable medium 1506 provides the same or similar functionality as that described with reference to computer-readable medium 116 of controller 108 though referring to second controller 108a. Third processor 1508 provides the same or similar functionality as that described with reference to processor 118 of controller 108 though referring to second controller 108a.

Second control application 120a performs operations associated with controlling converter 106 based on switch vectors and subycycle durations read from switch sequence data 1312. The operations may be implemented using hardware, firmware, software, or any combination of these methods. Referring to the example embodiment of FIG. 15, second control application 120a is implemented in software (comprised of computer-readable and/or computer-executable instructions) stored in third computer-readable medium 1506 and accessible by third processor 1508 for execution of the instructions that embody the operations of second control application 120a. Second control application 120a may be written using one or more programming languages, assembly languages, scripting languages, etc.

Figure 16:
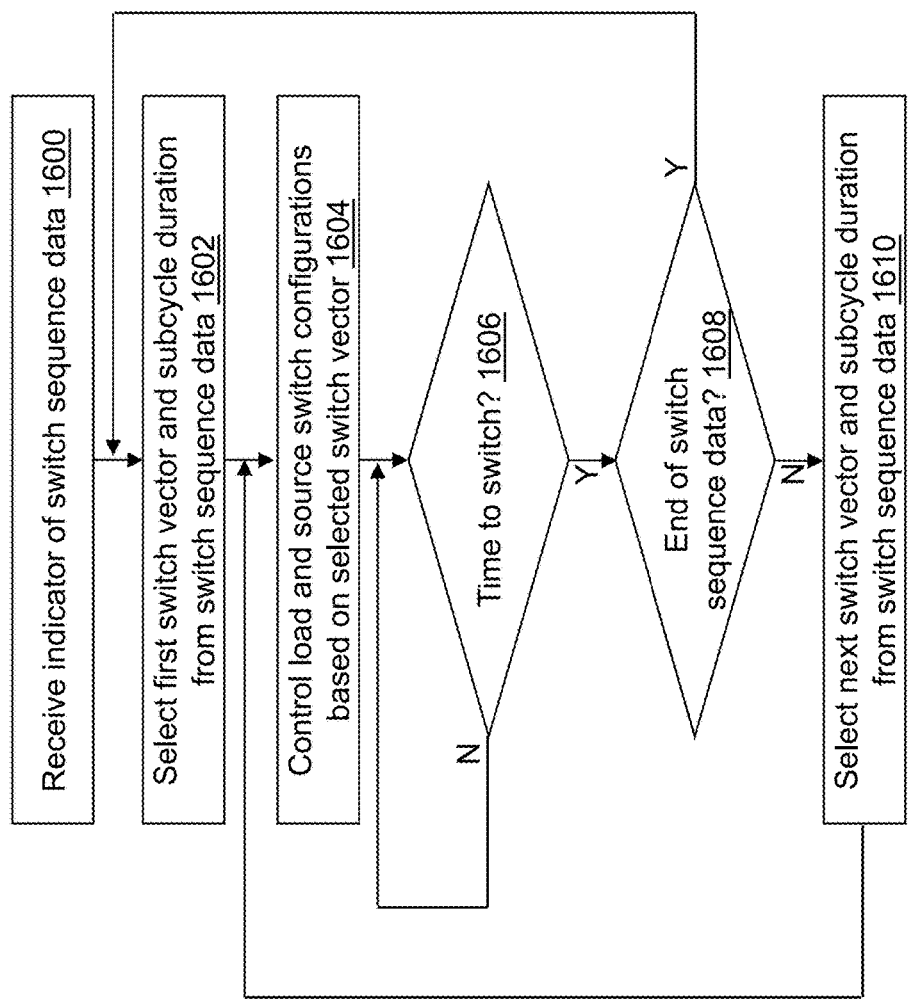
FIG. 16 depicts a flow diagram illustrating examples of operations performed by a control application of the converter of the energy transfer system of FIG. 15 in accordance with an illustrative embodiment

Referring to FIG. 16, example operations associated with second control application 120a are described. Second control application 120a may control converter 106 operating as a DC-AC inverter, a DC-AC rectifier, a DC-DC converter, or an AC-AC converter with any number of loads and sources. Additional, fewer, or different operations may be performed depending on the embodiment. The order of presentation of the operations of FIG. 16 is not intended to be limiting. Although some of the operational flows are presented in sequence, the various operations may be performed in various repetitions, concurrently, and/or in other orders than those that are illustrated. As understood by a person of skill in the art, various operations may be performed in parallel, for example, using a plurality of threads or a plurality of processors.

In an operation 1600, a second indicator may be received that indicates switch sequence data 1312. For example, the second indicator indicates a location and a name of switch sequence data 1312. As an example, the second indicator may be received after selection from a user interface window or after entry by a user into a user interface window. In an alternative embodiment, switch sequence data 1312 may not be selectable. For example, a most recently created dataset may be used automatically. Switch sequence data 1312 may be read into a local memory or a cache of third computer-readable medium 1506 for rapid access by second controller 108a.

In an operation 1602, the first switch vector and the subcycle duration for the first switch vector are selected from switch sequence data 1312, for example, by reading a first non-header record from switch sequence data 1312.

In an operation 1604, the load and source switches (e.g. source control switch 504, first half-bridge 230, a second half-bridge 232, and third half-bridge 234) are controlled based on the switch state defined by the first switch vector selected in operation 1602.

In an operation 1606, a determination is made concerning whether or not it is time to change the switch state for the next subcycle. When it is time to switch, processing continues in an operation 1608. When it is not time to switch, processing continues in operation 1606 until it is time. As a result, the switch state is maintained for the subcycle duration.

In operation 1608, a determination is made concerning whether or not the end of the switch sequence data has been reached. When the end of the switch sequence data has been reached, processing continues in operation 1602 to repeat the selection of the switch vectors for the next cycle. When the end of the switch sequence data has not been reached, processing continues in an operation 1610.

In operation 1610, the next switch vector and the subcycle duration for the next switch vector are selected from switch sequence data 1312, for example, by reading a next record from switch sequence data 1312 or accessing a next memory location. Processing continues in operation 1604 to control the switches based on the next switch vector.

To illustrate operation of control application 120, as stated previously, a switching period at time instant 706 has values for $V_{DC}=1$, $V_A=0.85$, $V_B=-0.08$, $V_C=-0.77$, and $I_A=0.64$, $I_B=-0.06$, $I_C=-0.58$, and $I_{DC}=-1$. In terms of the reduced circuit values, $V_p=V_A$, $V_n=V_C$, and $V_i=V_B$ making $V_{pi}=V_{AB}$, $V_{in}=V_{BC}$, $I_{pi}=I_A=0.64$ and $I_{in}=-I_C=0.58$.

Figure 17:
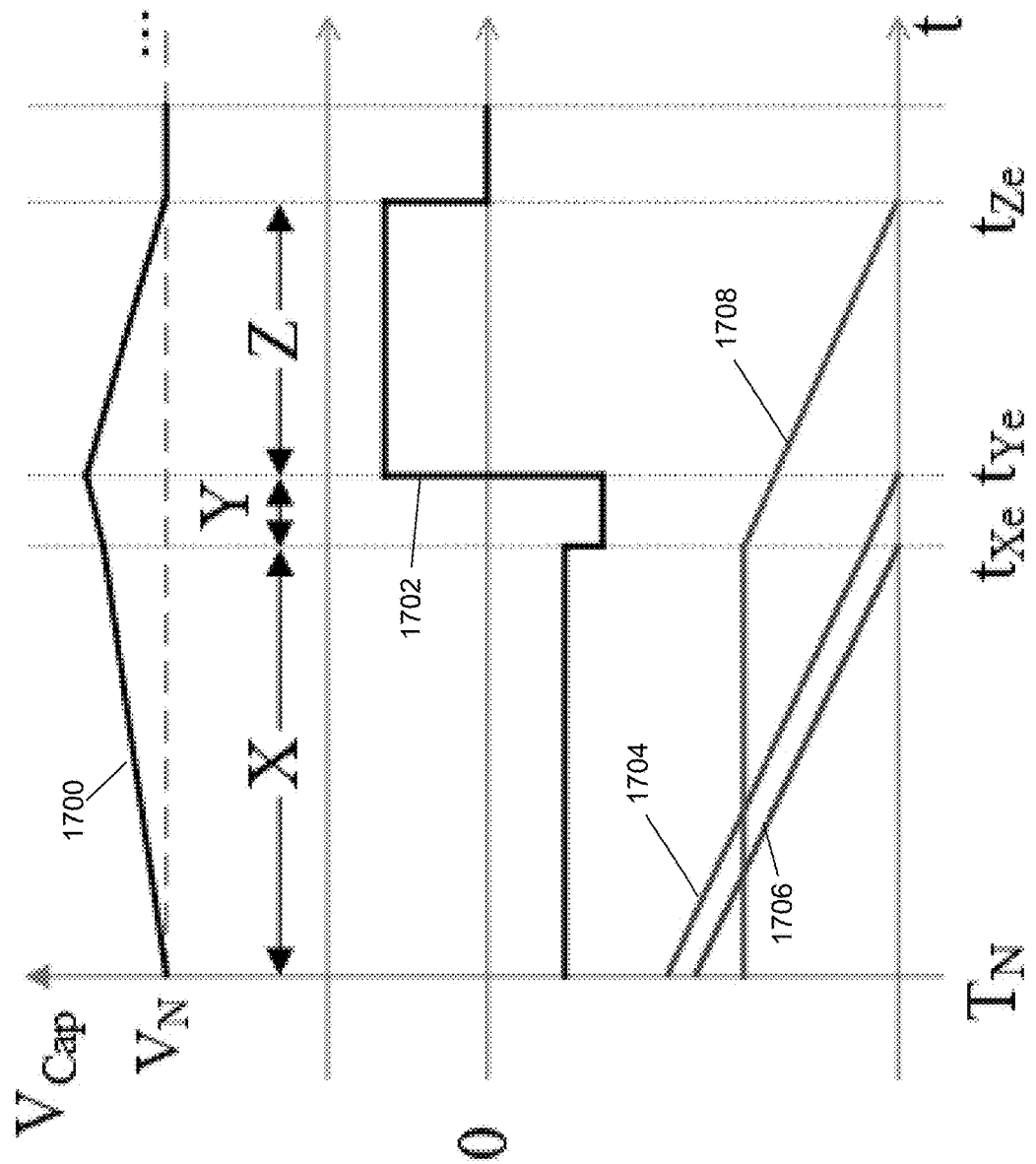
FIG. 17 shows a switching period at a time instant illustrated in FIG. 7 and application of a switch state selection mode that minimizes a current across the link capacitor of the energy transfer system of FIG. 1 in accordance with an illustrative embodiment.
Figure 5:
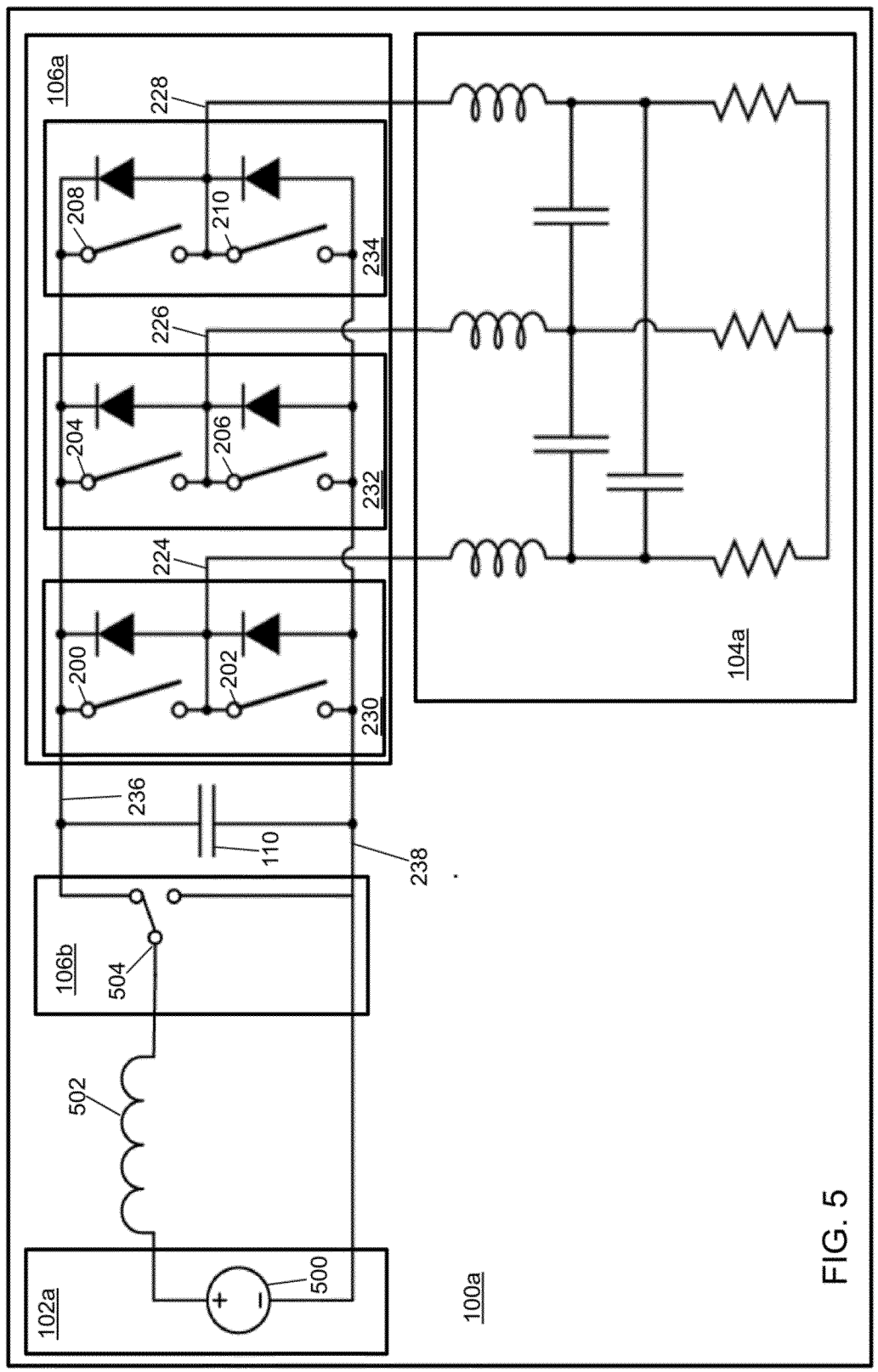

Assume that switch state selection mode is "minimize a capacitor current". Referring to FIG. 17, capacitor voltage $V_{Cap}$ curve 1700 shows the $J_{LS}=3$ subcycles X, Y, Z. As stated previously, to minimize the capacitor current, the minimum absolute value of current is considered. Equivalent capacitor current $I_{Cap}$ curve 1702 shows the current. DC error curve 1704 shows $e_{DC}$ for each subcycle X, Y, Z based on $J_{LS}=3$ subcycles. PI error curve 1706 shows $e_{pi}$ for each subcycle X, Y, Z. IN error curve 1708 shows in for each subcycle X, Y, Z. A first reduced switch vector $S_{rX}$ was selected as [1,1,0] because $I_{Cap}$ can be selected from $I_{pi}=0.64$, $I_{in}=0.58$, $I_{DC}=-1$, $I_{DC}+I_{pi}=0.36$, and $I_{DC}+I_{in}=-0.42$. The minimum absolute value of the current is $|I_{DC}+I_{pi}|=0.36$, which corresponds to source control switch 504 and p-phase circuit switch 1104 in the 'on' configuration and n-phase circuit switch 1110 in the 'off' configuration. According to Table 1, first switch vector $S_X$ was selected as [1,1,0,0], which corresponds to source control switch 504 and first half-bridge 230 in the 'on' configuration and second half-bridge 232 and third half-bridge 234 in the 'off' configuration until $t_{Xe}$. For the period from $T_N$ to $t_{Xe}$, $V_{pi}=V_{DC}=V_{Cap}$ and $V_{in}=0$. At $t_{Xe}$, $e_{pi}=0$, because $V_{pi}<V_{DC}$. As a result, p-phase circuit switch 1104 is switched to the 'off' configuration the remainder of the switching period $T_S$. The average voltage across link capacitor 110 is 0.93. As a result, at $t_{Xe}$, $e_{DC}=1-0.93=0.07$. Since n-phase circuit switch 1110 was in the 'off' configuration, $e_{in}=V_{in}^*=0.69$, its commanded value. The first subcycle duration is $t_{Xe}-T_N$.

For the next subcycle Y, the states for only source control switch 504 and n-phase circuit switch 1110 remain. A second reduced switch vector $S_{rY}$ was selected as [1,0,1] because $I_{Cap}$ can be selected from $I_{in}=0.58$, $I_{DC}=-1$, and $I_{DC}+I_{in}=-0.42$. $I_{DC}+I_{in}=0.42$ results in minimum absolute value of the current, which corresponds to source control switch 504 and n-phase circuit switch 1110 in the 'on' configuration and p-phase circuit switch 1104 in the 'off' configuration. If there were additional currents a minimum would be selected. According to Table 1, second switch vector $S_Y$ was selected as [1,1,1,0], which corresponds to source control switch 504, second half-bridge 232 and first half-bridge 230 in the 'on' configuration and third half-bridge 234 in the 'off' configuration until $t_{Ye}$. For the period from $t_{Xe}$ to $t_{Ye}$, $V_{pi}=0$ and $V_{DC}=V_{in}=V_{Cap}$. At $t_{Ye}$, $e_{DC}=0$. As a result, source control switch 504 is switched to the 'off' configuration the remainder of the switching period $T_S$. The average voltage across link capacitor 110 is 0.07. Since n-phase circuit switch 1110 was in the 'on' configuration, $e_{in}=0.69-0.07=0.62$, its remaining value. The second subcycle duration is $t_{Ye}-t_{Xe}$.

For the last subcycle Z, the state for only n-phase circuit switch 1110 remains. A third reduced switch vector $S_{rZ}$ was selected as [0,0,1] and $I_{Cap}$ was selected as $I_{in}=0.58$, which corresponds to n-phase circuit switch 1110 in the 'on' configuration and p-phase circuit switch 1104 and source control switch 504 in the 'off' configuration. According to Table 1, third switch vector $S_Z$ was selected as [0,1,1,0], which corresponds to first half-bridge 230 and second half-bridge 232 in the 'on' configuration and source control switch 504 and third half-bridge 234 in the 'off' configuration until $t_{Ze}$. The end of the third subcycle is determined when $V_N=V_{Cap}$. The third subcycle duration is $t_{Ze}-t_{Ye}$. The remaining time until the end of the switching period is $T_S-t_{Ze}$. As a result, an idle switch vector $S_i$ may be selected as [0,0,0,0] or [0,1,1,1] for an idle subcycle duration $T_S-t_{Ze}$.

As another example, assume that switch state selection mode is "minimize a capacitor voltage ripple" for the same time instant 706. A first reduced switch vector $S_{rX}$ was selected as [1,0,1] based on a minimum power flow into link capacitor 110 of $V_{in}^*(I_{DC}+I_{in})=-0.29$, which corresponds to source control switch 504 and n-phase circuit switch 1110 in the 'on' configuration and p-phase circuit switch 1104 in the 'off' configuration. According to Table 1, first switch vector $S_X$ was selected as [1,1,1,0], which corresponds to source control switch 504, first half-bridge 230, and second half-bridge 232 in the 'on' configuration and third half-bridge 234 in the 'off' configuration until $t_{Xe}$. For the period from $T_N$ to $t_{Xe}$, $V_{in}=V_{DC}=V_{Cap}$ and $V_{pi}=0$. At $t_{Xe}$, $e_{in}=0$, because $V_{in}<V_{DC}$. As a result, n-phase circuit switch 1110 is switched to the 'off' configuration the remainder of the switching period $T_S$. The average voltage across link capacitor 110 is 0.69. As a result, at $t_{Xe}$, $e_{DC}=1-0.69=0.31$. Since p-phase circuit switch 1104 was in the 'off' configuration, $e_{pi}=V_{pi}^*=0.93$, its commanded value. The first subcycle duration is $t_{Xe}-T_N$.

For the next subcycle Y, the states for only source control switch 504 and p-phase circuit switch 1104 remain. A second reduced switch vector $S_{rY}$ was selected as [1,1,0] based on a minimum power flow into link capacitor 110 of $V_{pi}^*(I_{DC}+I_{pi})=0.93(-0.36)$, which corresponds to source control switch 504 and p-phase circuit switch 1104 in the 'on' configuration and n-phase circuit switch 1110 in the 'off' configuration. According to Table 1, second switch vector $S_y$ was selected as [1,1,0,0], which corresponds to second half-bridge 232 and third half-bridge 234 in the 'off' configuration and source control switch 504 and first half-bridge 230 in the 'on' configuration until $t_{Ye}$. For the period from $t_{Xe}$ to $t_{Ye}$, $V_{pi}=V_{DC}=V_{Cap}$ and $V_{in}=0$. At $t_{Ye}$, $e_{dc}=0$, because $V_{DC}<V_{pi}$. As a result, source control switch 504 is switched to the 'off' configuration the remainder of the switching period $T_S$. The average voltage across link capacitor 110 is 0.31. $e_{pi}=0.93-0.31=0.62$, its remaining value. The second subcycle duration is $t_{Ye}-t_{Xe}$.

For the last subcycle Z, the state for only p-phase circuit switch 1104 remains. A third reduced switch vector $S_{rZ}$ was selected as [0,1,0], which corresponds to p-phase circuit switch 1104 in the 'on' configuration and source control switch 504 and n-phase circuit switch 1110 in the 'off' configuration. According to Table 1, third switch vector $S_Z$ was selected as [0,1,0,0], which corresponds to first half-bridge 230 in the 'on' configuration and second half-bridge 232, source control switch 504, and third half-bridge 234 in the 'off' configuration until $t_{Ze}$. The end of the third subcycle is determined when $V_N = V_{Cap}$. The third subcycle duration is $t_{Ze} - t_{Ye}$. The remaining time until the end of the switching period is $T_S - t_{Ze}$. As a result, an idle switch vector $S_i$ may be selected as [0,0,0,0] or [0,1,1,1] for an idle subcycle duration $T_S - t_{Ze}$.

As yet another example, assume that switch state selection mode is "minimize switch state changes" for the same time instant 706 and maximum number of switch state changes per subcycle $M_S = 2$. A first reduced switch vector $S_{rX}$ was selected as [1,1,0] by making a random selection from $I_{pi} = 0.64$, $I_{in} = 0.58$, $I_{DC} = -1$, $I_{DC} + I_{pi} = 0.36$, and $I_{DC} + I_{in} = -0.42$, which corresponds to source control switch 504 and p-phase circuit switch 1110 in the 'on' configuration and n-phase circuit switch 1104 in the 'off' configuration. According to Table 1, first switch vector $S_X$ was selected as [1,1,0,0], which corresponds to source control switch 504 and first half-bridge 230 in the 'on' configuration and second half-bridge 232 and third half-bridge 234 in the 'off' configuration until $t_{Xe}$. For the period from $T_N$ to $t_{Xe}$, $V_{pi} = V_{DC} = V_{cap}$ and $V_{in} = 0$. At $t_{Xe}$, $e_{pi} = 0$, because $V_{pi} < V_{DC}$. As a result, p-phase circuit switch 1104 is switched to the 'off' configuration the remainder of the switching period $T_S$. The average voltage across link capacitor 110 is 0.93. As a result, at $t_{Xe}$, $e_{DC} = 1 - 0.93 = 0.07$. Since n-phase circuit switch 1110 was in the 'off' configuration, $e_{in} = V_{in}^* = 0.69$, its commanded value. The first subcycle duration is $t_{Xe} - T_N$.

For the next subcycle Y, the states for only source control switch 504 and n-phase circuit switch 1110 remain. A second reduced switch vector $S_{rY}$ was selected as [1,0,1] based on allowing only one other switch in addition to p-phase circuit switch 1104 being switched to the 'off' configuration to change state (<2), which corresponds to source control switch 504 and n-phase circuit switch 1110 in the 'on' configuration and p-phase circuit switch 1104 in the 'off' configuration. According to Table 1, second switch vector $S_Y$ was selected as [1,1,1,0], which corresponds to third half-bridge 234 in the 'off' configuration and second half-bridge 232, source control switch 504, and first half-bridge 230 in the 'on' configuration until $t_{Ye}$. For the period from $t_{Xe}$ to $t_{Ye}$, $V_{in} = V_{DC} = V_{Cap}$ and $V_{pi} = 0$. At $t_{Ye}$, $e_{dc} = 0$, because $V_{DC} < V_{in}$. As a result, source control switch 504 is switched to the 'off' configuration the remainder of the switching period $T_S$. The average voltage across link capacitor 110 is 0.07. $e_{in} = 0.69 - 0.07 = 0.62$, its remaining value. The second subcycle duration is $t_{Ye} - t_{Xe}$.

For the last subcycle Z, the state for only n-phase circuit switch 1110 remains. A third reduced switch vector $S_{rZ}$ was selected as [0,0,1], which corresponds to n-phase circuit switch 1110 in the 'on' configuration and source control switch 504 and p-phase circuit switch 1104 in the 'off' configuration. According to Table 1, third switch vector $S_Z$ was selected as [0,1,0,0], which corresponds to first half-bridge 230 and second half-bridge 232 in the 'on' configuration and source control switch 504 and third half-bridge 234 in the 'off' configuration until $t_{Ze}$. The end of the third subcycle is determined when $V_N = V_{Cap}$. The third subcycle duration is $t_{Ze} - t_{Ye}$. The remaining time until the end of the switching period is $T_S - t_{Ze}$. As a result, an idle switch vector $S_i$ may be selected as [0,0,0,0] or [0,1,1,1] for an idle subcycle duration $T_S - t_{Ze}$.

As still another example, assume that switch state selection mode is "minimize a capacitor voltage deviation" for the same time instant 706. A first reduced switch vector $S_{rX}$ was selected as [1,0,1] based on a minimum power flow into link capacitor 110 of $V_{in}^*(I_{DC} + I_{in}) = -0.29$, which corresponds to source control switch 504 and n-phase circuit switch 1110 in the 'on' configuration and p-phase circuit switch 1104 in the 'off' configuration. According to Table 1, first switch vector $S_X$ was selected as [1,1,1,0], which corresponds to source control switch 504, first half-bridge 230, and second half-bridge 232 in the 'on' configuration and third half-bridge 234 in the 'off' configuration until $t_{Xe}$. For the period from $T_N$ to $t_{Xe}$, $V_{in} = V_{DC} = V_{Cap}$ and $V_{pi} = 0$. At $t_{Xe}$, $e_{in} = 0$, because $V_{in} < V_{DC}$. As a result, n-phase circuit switch 1110 is switched to the 'off' configuration the remainder of the switching period $T_S$. The average voltage across link capacitor 110 is 0.69. As a result, at $t_{Xe}$, $e_{DC} = 1 - 0.69 = 0.31$. Since p-phase circuit switch 1104 was in the 'off' configuration, $e_{pi} = V_{pi}^* = 0.93$, its commanded value. The first subcycle duration is $t_{Xe} - T_N$.

For the next subcycle Y, the states for only source control switch 504 and p-phase circuit switch 1104 remain. A second reduced switch vector $S_{rY}$ was selected as [0,1,0] so that link capacitor 110 is discharged (because subcycle X was a charge cycle), which corresponds to p-phase circuit switch 1104 in the 'on' configuration and source control switch 504 and n-phase circuit switch 1110 in the 'off' configuration. According to Table 1, second switch vector $S_Y$ was selected as [0,1,0,0], which corresponds to first half-bridge 230 in the 'on' configuration and source control switch 504, second half-bridge 232, and third half-bridge 234 in the 'off' configuration until $t_{Ye}$. For the period from $t_{Xe}$ to $t_{Ye}$, $V_{in} = V_{DC} = 0$ and $V_{pi} = V_{Cap}$. At $t_{Ye}$, $e_{pi} = 0$ As a result, p-phase circuit switch 1104 is switched to the 'off' configuration the remainder of the switching period $T_S$. The average voltage across link capacitor 110 is 0.93. The second subcycle duration is $t_{Ye} - t_{Xe}$.

For the last subcycle Z, the state for only source control switch 504 remains. A third reduced switch vector $S_{rZ}$ was selected as [1,0,0], which corresponds to source control switch 504 in the 'on' configuration and n-phase circuit switch 1110 and p-phase circuit switch 1104 in the 'off' configuration. According to Table 1, third switch vector $S_Z$ was selected as [1,0,0,0], which corresponds to source control switch 504 in the 'on' configuration and first half-bridge 230, second half-bridge 232, and third half-bridge 234 in the 'off' configuration until $t_{Ze}$. The end of the third subcycle is determined when $V_N = V_{Cap}$. The third subcycle duration is $t_{Ze} - t_{Ye}$. The remaining time until the end of the switching period is $T_S - t_{Ze}$. As a result, an idle switch vector $S_i$ may be selected as [0,0,0,0] or [0,1,1,1] for an idle subcycle duration $T_S - t_{Ze}$.

As stated previously, converter 106 and controller 108 may be used for any number of DC and AC sources or loads with application of the switch state selection mode(s) applied in a similar manner. The size of link capacitor 110 can be reduced by several orders of magnitude (e.g., 1 µF compared to 100-2000 µF) without increasing the voltage ratings of the semiconductor devices that make up converter 106. Electrolytic capacitors for link capacitor 110 can be replaced by film capacitors which have a much longer lifespan. The weight and volume of energy transfer system 100 and/or second energy transfer system 100a also can be significantly reduced.

As used in this disclosure, the term "connect" indicates an electrical connection whether by wire or by air or some other medium that conducts an electrical signal. "Connect" encompasses a direct connection (in which the referenced elements are in direct contact) and an indirect connection (in which the referenced elements are not in direct contact, but are connected via intermediate elements).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

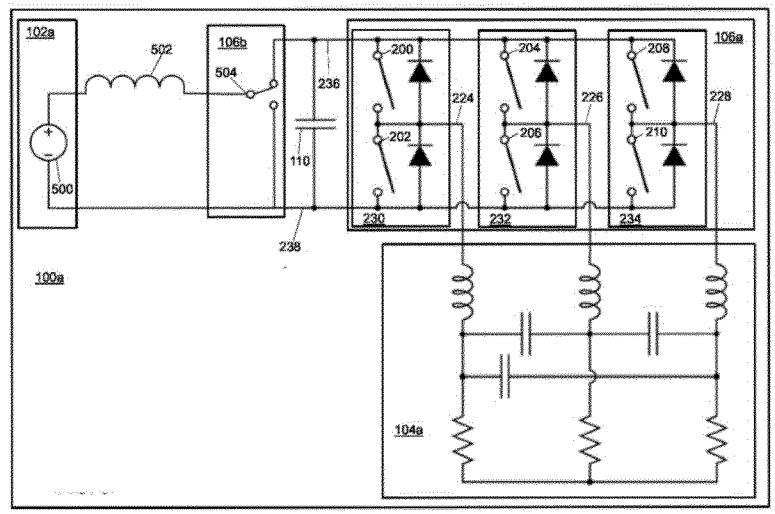

What is claimed is:

1. A non-transitory computer-readable medium having stored thereon computer-readable instructions that when executed by a processor cause the processor to:
    receive a time period value of a switching period;
    determine a number of switching subcycles during the switching period;
    receive a load voltage value and a load current value for a load circuit, wherein the load circuit is either a direct current (DC) load circuit or an alternating current (AC) load circuit having a number of load phases, wherein a load switch is connected to the DC load circuit or to each load phase of the load phases of the AC load circuit;
    receive a source voltage value and a source current value for a source circuit, wherein the source circuit is either a DC source circuit or an AC source circuit having a number of source phases, wherein a source switch is connected to the DC source circuit or to each source phase of the source phases of the AC source circuit;
    receive a capacitor voltage value of a voltage across a capacitor connected in parallel across the source switch and the load switch;
    (a) select a switch vector based on the received load voltage value, the received load current value, the received source voltage value, the received source current value, the received capacitor voltage value, and a predefined switch state selection mode, wherein the switch vector identifies a state associated with each load switch and with each source switch during a subcycle, wherein the state defines an on configuration or an off configuration, wherein during the on configuration current flows between a positive terminal of the capacitor and the load switch or the source switch, and during the off configuration the current does not flow between the positive terminal of the capacitor and the load switch or the source switch;
    (b) control the state of each load switch and each source switch in the on configuration or in the off configuration based on the selected switch vector;
    (c) determine that it is time to select a next switch vector; and
    (d) repeat (a) to (c) for each subcycle of the determined number of switching subcycles;
    wherein at least one load switch and at least one source switch are simultaneously in the on configuration during at least one subcycle of the determined number of switching subcycles.

2. The non-transitory computer-readable medium of claim 1, wherein the switch vector for a last subcycle of the determined number of switching subcycles is selected to charge the capacitor or to discharge the capacitor to a predefined, nominal capacitor voltage value.

3. The non-transitory computer-readable medium of claim 1, wherein (c) comprises:
    receiving an updated capacitor voltage value of the voltage across the capacitor;
    comparing the received, updated capacitor voltage value to a predefined, nominal capacitor voltage value; and
    when the received updated capacitor voltage value is equal to the predefined, nominal capacitor voltage value, determining that it is time to select the next switch vector.

4. The non-transitory computer-readable medium of claim 1, wherein (c) comprises:
    determining an error in an average voltage across each load switch and each source switch in the on configuration; and
    when the determined error is equal to zero across a switch of the at least one load switch and the at least one source switch in the on configuration, determining that it is time to select the next switch vector.

5. The non-transitory computer-readable medium of claim 4, wherein after (c) and before (d), the computer-readable instructions further cause the computing device to control the switch having the determined error equal to zero to an off configuration a remainder of the switching period.

6. The non-transitory computer-readable medium of claim 1, wherein after (d), each load switch and each source switch is in the off configuration until an end of a current switching period defined based on the received time period value and a start time of the current switching period.

7. The non-transitory computer-readable medium of claim 1, wherein the load circuit is the DC load circuit and the source circuit is the DC source circuit, wherein the number of switching subcycles is determined as a number of DC load circuits of the load circuit plus a number DC source circuits of the source circuit.

8. The non-transitory computer-readable medium of claim 1, wherein the source switch is a single pole, double throw switch.

9. The non-transitory computer-readable medium of claim 1, wherein the load circuit is the AC load circuit or the source circuit is the AC source circuit, wherein the selected switch vector is a selected, reduced switch vector and (a) further comprises:
    mapping the selected, reduced switch vector to the switch vector;

wherein the controlling the state of each load switch and each source switch is based on the mapped, selected switch vector.

10. The non-transitory computer-readable medium of claim 1, wherein the load circuit is the DC load circuit and the source circuit is the AC source circuit, wherein the number of switching subcycles is determined as $N_{SS}=N_{DCL}+\Sigma_{i=1}^{N_{ACS}}(N_{\varnothing i}-1)$, where $N_{SS}$ is the number of switching subcycles, $N_{DCL}$ is a number of DC load circuits of the load circuit, $N_{ACS}$ is a number of AC source circuits of the source circuit, and $N_{\varnothing i}$ is the number of source phases of a respective AC source circuit.

11. The non-transitory computer-readable medium of claim 1, wherein the load circuit is the AC load circuit and the source circuit is the AC source circuit, wherein the number of switching subcycles is determined as $N_{SS}=\Sigma_{i=1}^{N_{ACL}}(N_{\varnothing Li}-1)+\Sigma_{j=1}^{N_{ACS}}(N_{\varnothing Sj}-1)$, where $N_{SS}$ is the number of switching subcycles, $N_{ACL}$ is a number of AC load circuits of the load circuit, $N_{ACS}$ is a number of AC source circuits of the source circuit, $N_{\varnothing Li}$ is the number of load phases of a respective AC load circuit, and $N_{\varnothing Sj}$ is the number of source phases of a respective AC source circuit.

12. The non-transitory computer-readable medium of claim 1, wherein the load circuit is the AC load circuit and the source circuit is the DC source circuit, wherein the number of switching subcycles is determined as $N_{SS}=N_{DCS}+\Sigma_{i=1}^{N_{ACS}}(N_{\varnothing i}-1)$, where $N_{SS}$ is the number of switching subcycles, $N_{DCS}$ is a number of DC source circuits of the source circuit, $N_{ACL}$ is a number of AC load circuits of the load circuit, and $N_{\varnothing i}$ is the number of load phases of a respective AC load circuit.

13. The non-transitory computer-readable medium of claim 1, wherein the predefined switch state selection mode includes a plurality of modes applied in a predefined order to select the switch vector.

14. The non-transitory computer-readable medium of claim 1, wherein the predefined switch state selection mode is selected from the group consisting of minimize a voltage ripple across the capacitor, minimize a number of switch state changes each subcycle, minimize a voltage deviation from a predefined, nominal capacitor voltage value, and minimize a current through the capacitor.

15. The non-transitory computer-readable medium of claim 1, wherein after (b) and before (c), the computer-readable instructions further cause the computing device to:
receive an updated capacitor voltage value of the voltage across the capacitor;
receive an updated load voltage value for the load circuit; and
receive an updated source voltage value for the source circuit,
wherein determining that it is time to select the next switch vector is based on at least one of the updated capacitor voltage value, the updated load voltage value, and the updated source voltage value.

16. The non-transitory computer-readable medium of claim 1, wherein after (d), the computer-readable instructions further cause the computing device to:
receive an updated load voltage value and an updated load current value for the load circuit;
receive an updated source voltage value and an updated source current value for the source circuit;
receive an updated capacitor voltage value of the voltage across the capacitor; and
repeat (a) to (d) for each subcycle of the determined number of switching subcycles using the updated load voltage value as the received load voltage value, the updated load current value as the received load current value, the updated source voltage value as the received source voltage value, the updated source current value as the received source current value, and the updated capacitor voltage value as the received capacitor voltage value.

17. The non-transitory computer-readable medium of claim 1, wherein the switch vector is selected by reading a next switch vector and a next subcycle end time from the non-transitory computer-readable medium, wherein determining that it is time to select a next switch vector is based on the read next subcycle end time.

18. The non-transitory computer-readable medium of claim 17, wherein after (d), each load switch and each source switch is in the off configuration until an end of a current switching period defined based on the received time period value and a start time of the current switching period.

19. A controller comprising:
a processor; and
a non-transitory computer-readable medium operably coupled to the processor, the computer-readable medium having computer-readable instructions stored thereon that, when executed by the processor, cause the processor to
receive a time period value of a switching period;
determine a number of switching subcycles during the switching period;
receive a load voltage value and a load current value for a load circuit, wherein the load circuit is either a direct current (DC) load circuit or an alternating current (AC) load circuit having a number of load phases, wherein a load switch is connected to the DC load circuit or to each load phase of the load phases of the AC load circuit;
receive a source voltage value and a source current value for a source circuit, wherein the source circuit is either a DC source circuit or an AC source circuit having a number of source phases, wherein a source switch is connected to the DC source circuit or to each source phase of the source phases of the AC source circuit;
receive a capacitor voltage value of a voltage across a capacitor connected in parallel across the source switch and the load switch;
(a) select a switch vector based on the received load voltage value, the received load current value, the received source voltage value, the received source current value, the received capacitor voltage value, and a predefined switch state selection mode, wherein the switch vector identifies a state associated with each load switch and with each source switch during a subcycle, wherein the state defines an on configuration or an off configuration, wherein during the on configuration current flows between a positive terminal of the capacitor and the load switch or the source switch, and during the off configuration the current does not flow between the positive terminal of the capacitor and the load switch or the source switch;
(b) control the state of each load switch and each source switch in the on configuration or in the off configuration based on the selected switch vector;
(c) determine that it is time to select a next switch vector; and
(d) repeat (a) to (c) for each subcycle of the determined number of switching subcycles;

wherein at least one load switch and at least one source switch are simultaneously in the on configuration during at least one subcycle of the determined number of switching subcycles.

20. A device comprising:
a source switch;
a load switch;
a link capacitor connected in parallel across the source switch and the load switch;
a processor; and
a non-transitory computer-readable medium operably coupled to the processor, the computer-readable medium having computer-readable instructions stored thereon that, when executed by the processor, cause the processor to
receive a time period value of a switching period;
determine a number of switching subcycles during the switching period;
receive a load voltage value and a load current value for a load circuit, wherein the load circuit is either a direct current (DC) load circuit or an alternating current (AC) load circuit having a number of load phases, wherein the load switch is connected to the DC load circuit or to each load phase of the load phases of the AC load circuit;
receive a source voltage value and a source current value for a source circuit, wherein the source circuit is either a DC source circuit or an AC source circuit having a number of source phases, wherein the source switch is connected to the DC source circuit or to each source phase of the source phases of the AC source circuit;
receive a capacitor voltage value of a voltage across the link capacitor;

(a) select a switch vector based on the received load voltage value, the received load current value, the received source voltage value, the received source current value, the received capacitor voltage value, and a predefined switch state selection mode, wherein the switch vector identifies a state associated with each load switch and with each source switch during a subcycle, wherein the state defines an on configuration or an off configuration, wherein during the on configuration current flows between a positive terminal of the capacitor and the load switch or the source switch, and during the off configuration the current does not flow between the positive terminal of the capacitor and the load switch or the source switch;

(b) control the state of each load switch and each source switch in the on configuration or in the off configuration based on the selected switch vector;

(c) determine that it is time to select a next switch vector; and (d) repeat (a) to (c) for each subcycle of the determined number of switching subcycles;

wherein at least one load switch and at least one source switch are simultaneously in the on configuration during at least one subcycle of the determined number of switching subcycles.

\* \* \* \* \*

UNITED STATES PATENT AND TRADEMARK OFFICE
CERTIFICATE OF CORRECTION

PATENT NO. : 10,243,447 B2  
APPLICATION NO. : 15/422766  
DATED : March 26, 2019  
INVENTOR(S) : Venkata Giri Venkataramanan et al.

Page 1 of 5

It is certified that error appears in the above-identified patent and that said Letters Patent is hereby corrected as shown below:

On the Title Page

Delete the title page and substitute therefore with the attached title page consisting of the corrected illustrative figure.

In the Drawings

Please replace FIG. 5 with FIG. 5 as shown on the attached page.

In the Specification

Column 8, Line 20:
Delete the phrase "$CV_N^2/2$," and replace with --$\frac{CV_N^2}{2}$--.

Column 11, Line 27:
Delete the phrase "$V_{in} = V_L - V_n$," and replace with --$V_{in} = V_i - V_n$,--.

Column 12, Line 34:
Delete the phrase "$V_j = V_{Cap}\ g_j$" and replace with --$V_j = V_{Cap}g_j$--.

Column 16, Lines 39-40:
Delete the phrase "$J_L = \sum_{i=1}^{N_{ACL}}(N_{\emptyset Li} - 1),$" and replace with --$J_L = \sum_{i=1}^{N_{ACL}}(N_{\emptyset Li} - 1),$--.

Column 16, Line 45:
Delete the phrase "$J_S = \sum_{i=1}^{N_{ACS}}(N_{\emptyset Si} - 1),$" and replace with --$J_S = \sum_{i=1}^{N_{ACS}}(N_{\emptyset Si} - 1),$--.

Signed and Sealed this  
Twentieth Day of August, 2019

Andrei Iancu  
*Director of the United States Patent and Trademark Office*

CERTIFICATE OF CORRECTION (continued)
U.S. Pat. No. 10,243,447 B2

Column 16, Line 51:

Delete the phrase "$J_S = \sum_{i=1}^{N_{ACS}}(N_{\emptyset Si} - 1) + N_{DCS}.$" and replace with
--$J_S = \sum_{i=1}^{N_{ACS}}(N_{\emptyset Si} - 1) + N_{DCS}.$--.

Column 16, Line 52-53:

Delete the phrase "$J_L = \sum_{i=1}^{N_{ACL}}(N_{\emptyset i} - 1) + N_{DCL}.]$" and replace with
--$J_L = \sum_{i=1}^{N_{ACL}}(N_{\emptyset Li} - 1) + N_{DCL}.]$--.

Column 17, Line 51:

Delete the phrase "$e_j = V_j^* - \sum_{Q=1}^{J_{LS}}(\int_{T_N}^{t} g_{jQ} v_{Cap} dt),$" and replace with
--$e_j = V_j^* - \sum_{Q=1}^{J_{LS}}(\int_{T_N}^{t} g_{jQ} v_{Cap} dt)$--.

Column 17, Line 56:
Delete the phrase "$V_{DC}*$" and replace with --$V_{DC}^*$--.

Column 17, Line 63:

Delete the phrase "$e_j = V_j^* - \int_{T_N}^{t} V_j^m dt,$" and replace with --$e_j = V_j^* - \int_{T_N}^{t} V_j^m dt$--.

Column 18, Line 3:
Delete the phrase "$V_{AB}^m$ and $V_{BC}^m$" and replace with --$V_{AB}^m$ and $V_{BC}^m$--.

Column 23, Line 58:
Delete the phrase "$e_{in} = V_{in}* = 0.69,$" and replace with --$e_{in} = V_{in}^* = 0.69,$--.

Column 23, Line 64:
Delete the phrase "$I_{DC} + I_{in} = 0.42$" and replace with --$|I_{DC} + I_{in}| = 0.42$--.

Column 24, Line 32:
Delete the phrase "$V_{in}*(I_{DC} + I_{in}) = -0.29,$" and replace with --$V_{in}^*(I_{DC} + I_{in}) = -0.29,$--.

Column 24, Line 46:
Delete the phrase "$e_{pi} = V_{pi}* = 0.93,$" and replace with --$e_{pi} = V_{pi}^* = 0.93,$--.

Column 24, Lines 51-52:
Delete the phrase "$V_{pi}*(I_{DC} + I_{pi}) = 0.93 (-0.36),$" and replace with
--$V_{pi}^*(I_{DC} + I_{pi}) = 0.93(-0.36),$--.

Column 25, Line 35:
Delete the phrase "$e_{in} = V_{in}* = 0.69,$" and replace with --$e_{in} = V_{in}^* = 0.69,$--.

CERTIFICATE OF CORRECTION (continued)
U.S. Pat. No. 10,243,447 B2

Column 25, Line 42:
Delete the phrase "(< 2)," and replace with --(≤ 2),--.

Column 26, Line 8:
Delete the phrase "$V_{in}$ *$(I_{DC} + I_{in})$ = –0.29," and replace with --$V_{in}^*(I_{DC} + I_{in}) = -0.29$,--.

Column 26, Line 22:
Delete the phrase "$e_{pi} = V_{pi}$ * = 0.93," and replace with --$e_{pi} = V_{pi}^* = 0.93$,--.

In the Claims

Claim 10, Column 29, Lines 7-8:
Delete the phrase "$N_{SS} = N_{DCL} + \sum_{i=1}^{N_{ACS}}(N_{\phi i} - 1),$" and replace with --$N_{SS} = N_{DCL} + \sum_{i=1}^{N_{ACS}}(N_{\phi i} - 1),$--.

Claim 11, Column 29, Line 17:
Delete the phrase "$N_{SS} = \sum_{i=1}^{N_{ACL}}(N_{\phi Li} - 1) + \sum_{j=1}^{N_{ACS}}(N_{\phi Sj} - 1),$" and replace with --$N_{SS} = \sum_{i=1}^{N_{ACL}}(N_{\phi Li} - 1) + \sum_{j=1}^{N_{ACS}}(N_{\phi Sj} - 1),$--.

Claim 12, Column 29, Lines 26-27:
Delete the phrase "$N_{SS} = N_{DCS} + \sum_{i=1}^{N_{ACS}}(N_{\phi i} - 1),$" and replace with --$N_{SS} = N_{DCS} + \sum_{i=1}^{N_{ACL}}(N_{\phi i} - 1),$--.

(12) United States Patent
Venkataramanan et al.

(10) Patent No.: US 10,243,447 B2
(45) Date of Patent: Mar. 26, 2019

(54) CONVERTER CONTROL WITH REDUCED LINK CAPACITOR

(71) Applicant: Wisconsin Alumni Research Foundation, Madison, WI (US)

(72) Inventors: Venkata Giri Venkataramanan, Madison, WI (US); Mahima Gupta, Madison, WI (US)

(73) Assignee: WISCONSIN ALUMNI RESEARCH FOUNDATION, Madison, WI (US)

(*) Notice: Subject to any disclaimer, the term of this patent is extended or adjusted under 35 U.S.C. 154(b) by 0 days.

(21) Appl. No.: 15/422,766

(22) Filed: Feb. 2, 2017

(65) Prior Publication Data
US 2018/0219468 A1 Aug. 2, 2018

(51) Int. Cl.
*H02M 1/14* (2006.01)
*H02M 7/5387* (2007.01)
*H02M 1/00* (2006.01)

(52) U.S. Cl.
CPC .......... *H02M 1/14* (2013.01); *H02M 7/53875* (2013.01); *H02M 2001/0003* (2013.01)

(58) Field of Classification Search
CPC ......... H02M 3/33507; H02M 3/33523; H02M 3/3155; H02M 3/3376; H02M 1/12; H02M 1/126; H02M 1/14; H02M 1/143; H02M 1/146; H02M 1/15; H02M 2001/123; H02M 7/043; H02M 7/155; H02M 7/48; H02M 7/525; H02M 7/523; H02M 7/5236; H02M 7/53806; H02M 7/53875; H02M 7/5387; H02M 7/53871; H02M 7/537; H02M 7/003; Y02B 70/1441; Y02B 70/1433

USPC ....................... 363/95–98, 131–132
See application file for complete search history.

(56) References Cited

U.S. PATENT DOCUMENTS

| 4,677,539 A | 6/1987 | Erickson et al. |
| 6,879,062 B2 | 4/2005 | Oates |
| 7,102,903 B2 | 9/2006 | Nakamura et al. |
| 7,164,254 B2 | 1/2007 | Kerkman et al. |

(Continued)

OTHER PUBLICATIONS

Gupta, et al., A DC to Three-Phase Boost-Buck Inverter with Stored Energy Modulation and a Tiny DC Link Capacitor, 2016 IEEE Applied Power Electronics Conference and Exposition (APEC), Mar. 2016.

(Continued)

*Primary Examiner* — Kyle J Moody
*Assistant Examiner* — Kevin H Sprenger
(74) *Attorney, Agent, or Firm* — Bell & Manning, LLC

(57) ABSTRACT

A controller controls power between a source and a load with a link capacitor. (a) A switch vector is selected based on load and source values, a capacitor voltage value, and a switch state selection mode. The switch vector identifies an on or off configuration for load and source switches during a subcycle that allow or do not allow current flow between the link capacitor and the load switch or source switch. (b) The state of the load and source switches is controlled in the on configuration or in the off configuration based on the selected switch vector. (c) It is determined that it is time to select a next switch vector. (a) to (c) are repeated for each subcycle of the determined number of switching subcycles. At least one load switch and at least one source switch are simultaneously in the on configuration during at least one subcycle.

20 Claims, 18 Drawing Sheets